(12) United States Patent
Qiu et al.

(10) Patent No.: US 7,606,165 B2
(45) Date of Patent: *Oct. 20, 2009

(54) WHAT-IF ANALYSIS FOR NETWORK DIAGNOSTICS

(75) Inventors: Lili Qiu, Bellevue, WA (US); Paramvir Bahl, Sammamish, WA (US); Lidong Zhou, Sunnyvale, CA (US); Ananth Rajagopala Rao, El Cerrito, CA (US)

(73) Assignee: Microsoft Corporation, Redmond, WA (US)

( * ) Notice: Subject to any disclaimer, the term of this patent is extended or adjusted under 35 U.S.C. 154(b) by 869 days.

This patent is subject to a terminal disclaimer.

(21) Appl. No.: 10/880,960

(22) Filed: Jun. 30, 2004

(65) Prior Publication Data
US 2005/0169186 A1 Aug. 4, 2005

Related U.S. Application Data

(60) Provisional application No. 60/540,738, filed on Jan. 30, 2004.

(51) Int. Cl.
H04J 1/16 (2006.01)
H04L 12/26 (2006.01)

(52) U.S. Cl. ............... 370/252; 370/241; 370/241.1; 370/248; 370/389; 370/352; 370/353; 370/355; 370/356; 370/232; 370/234; 370/235; 370/203; 370/204; 370/205; 370/208; 370/400; 709/223; 703/6; 703/13; 703/14; 703/16; 703/17; 703/20; 703/21; 703/22; 455/423; 455/424; 455/67.11; 455/67.12; 455/67.14; 455/115.1; 455/115.2; 455/115.4; 455/226.1

(58) Field of Classification Search ............ None
See application file for complete search history.

(56) References Cited

U.S. PATENT DOCUMENTS

| | | | |
|---|---|---|---|
| 5,552,881 A | 9/1996 | Jezwinski et al. | |
| 5,561,762 A | 10/1996 | Smith et al. | |
| 5,809,282 A * | 9/1998 | Cooper et al. | 709/226 |
| 5,922,051 A | 7/1999 | Sidey et al. | |
| 6,594,268 B1 * | 7/2003 | Aukia et al. | 370/400 |
| 6,678,739 B1 | 1/2004 | Muraoka | |
| 7,100,081 B1 | 8/2006 | Purdy et al. | |
| 2002/0071392 A1 | 6/2002 | Grover et al. | |
| 2003/0093709 A1 | 5/2003 | Ogawa et al. | |
| 2003/0149919 A1 | 8/2003 | Greenwald et al. | |
| 2004/0078683 A1 | 4/2004 | Buia et al. | |
| 2004/0111502 A1 * | 6/2004 | Oates | 709/223 |
| 2004/0151129 A1 | 8/2004 | Kun-Szabo et al. | |

FOREIGN PATENT DOCUMENTS

WO    WO03094538    11/2003

* cited by examiner

*Primary Examiner*—Raj Jain
(74) *Attorney, Agent, or Firm*—Lee & Hayes, PLLC

(57) ABSTRACT

A network troubleshooting framework is described. In an implementation, a method includes generating a first estimation of network performance by a simulator based on network settings obtained from a network, estimating the new performance under an alternative setting by providing the alternative setting to the network simulation and observing the simulation output, repeating the procedure for other alternative settings, and suggesting the alternative setting that improves network performance.

15 Claims, 13 Drawing Sheets

WHAT-IF ANALYSIS FOR NETWORK DIAGNOSTICS

RELATED APPLICATIONS

The present invention claims priority under 35 U.S.C. § 119(e) to U.S. Provisional Patent Application Ser. No. 60/540,738, filed Jan. 30, 2004, which is titled "Fault Detection, Isolation, and Diagnosis in Multi-Hop Wireless Networks".

TECHNICAL FIELD

The present invention generally relates to wired and wireless networks, and more particularly relates to a framework for performing what-if analysis.

BACKGROUND

Network management, although a key ingredient in a successful deployment of a multi-hop wireless network, has received limited attention by both industry and research communities. Troubleshooting a network is an aspect of network management that is responsible for maintaining the "health" of the network and for ensuring its smooth and continued operation. Troubleshooting a network, whether wired or wireless, is complicated by interactions encountered among different network entities, among different faults, and so on.

Troubleshooting a multi-hop wireless network is further complicated by a variety of additional factors. For instance, typical multi-hop wireless networks are generally prone to link errors caused by signal propagation fluctuations. The signal propagation fluctuations may be caused by a variety of factors, such as fluctuating environmental conditions. These fluctuations result in a network topology that is dynamic and unpredictable. Node mobility further aggravates these factors, as nodes may be positioned in a variety of locations while connected to the network, thereby increasing the dynamic and unpredictable nature of the network. Additionally, the capacity of multi-hop wireless networks is generally limited due to scarcity of resources (e.g., bandwidth, battery power, and so on), which constrains the amount of management traffic overhead that the network can tolerate. Further, a wireless network may be vulnerable to link attacks from malicious parties. The attackers, for example, can inject false information to disrupt or interfere with the network management effort.

Traditional heuristic and theoretical techniques that were traditionally utilized to perform network troubleshooting typically do not capture the behavior of the network as implemented in a "real" environment. For example, network behavior may be governed by node interaction, one to another, as well as by external noise sources positioned in the vicinity of the nodes. Traditional heuristic or theoretical techniques do not capture the behavior of such a network and do not adequately address interaction between the different components of the network with its surrounding environment.

Accordingly, there is a continuing need for a framework for network troubleshooting.

SUMMARY

A network troubleshooting framework is described. The framework may employ a simulation of a real network to detect and diagnose faults in the operation of the real network. For example, a network simulation may be driven by data that describes the operation of the real network. In practice, raw data that is collected for use in driving the network simulation may contain errors for a variety of reasons, such as due to hardware, software, and/or network errors. To ensure that the data used to drive the network simulation is consistent, the raw data may be cleansed. For example, each node in a network may provide data for use in driving the network simulation. The data provided by a particular node may describe not only that particular node's operation, but also the operation of one or more neighboring nodes. Therefore, the data obtained from the nodes in the network may be redundant. The redundant data is then compared, one to another, to identify any inconsistencies, which may then be rectified in a variety of ways, such as through data averaging.

The network simulation may then estimate network performance based on this data. The estimated network performance is compared with observed network performance of the real network performance to detect if the real network is performing as expected. If not, a fault is detected in the operation of the real network. In other words, a difference between the estimated network performance as indicated by the network simulation and the observed network performance as indicated by the real network may be utilized to detect the occurrence of the fault in the real network. The network simulation may then be utilized to diagnose the fault by selectively injecting one or more faults into the network simulation until performance of the network simulation approximates the performance of the real network.

Once the one or more faults that resulted in the approximated network performance are identified, one or more modifications may be identified and implemented to correct the faults. For example, the network simulation may then be utilized to perform "what-if" analysis such that modifications may be made to simulated network to test whether the modification corrects the fault and/or otherwise improves network performance. Thus, the network simulation may provide quantitative feedback on the network performance impact of a variety of modifications that may be made to the network, which may then be implemented to correct the faults and/or improve network performance.

BRIEF DESCRIPTION OF THE DRAWINGS

The same numbers are used throughout the disclosure and figures to reference like components and features.

DETAILED DESCRIPTION

Overview

A network troubleshooting framework is described for use in wired and/or wireless networks to maintain efficient and reliable network operations. The framework described herein may employ an online trace-driven network simulation to detect faults and perform root cause analysis of the faults. The network simulation is "online" in that it may obtain network performance data from a "real" network. A trace is a utility that records a route for each hop through a network (e.g., a trip taken by a data packet from one router or other intermediate point to another in a network) between an originating device and a target device. The trace may be utilized to calculate an amount of time each hop took to perform as well as the specific intermediate device that routed the data packet.

The framework may be applied to diagnose performance problems (i.e., faults) caused by packet dropping, link congestion, medium access control (MAC) misbehavior, external noise, and so on. The framework may also be used to evaluate alternative network configurations to improve network performance. Although the following discussion describes the framework in an exemplary wireless network, the framework may also be employed in wired networks.

Exemplary Environment

As previously described, network management has received limited attention by both industry and research communities. Implementation of network management may involve continual monitoring of the functioning of the network, collection of information about the nodes and links in the network, removal of inconsistencies and noise from the reported data, analysis of the data, and performance of appropriate actions to improve network reliability and performance.

Troubleshooting a network is an aspect of network management that is responsible for maintaining the "health" of the network and for ensuring its smooth and continued operation. Troubleshooting a network, whether wired or wireless, may be complicated by a variety of interactions, such as interactions encountered between different network entities, interactions between faults, and so on. Troubleshooting a multi-hop wireless network is further complicated by a variety of additional factors. For instance, typical multi-hop wireless networks are generally prone to link errors caused by signal propagation fluctuations, which result in a network topology that is dynamic and unpredictable. Additionally, the capacity of multi-hop wireless networks is generally limited due to scarcity of resources (e.g., bandwidth, battery power, and so on), which also constrains the amount of management traffic overhead that the network can tolerate.

A framework is described which addresses these complications. The framework may utilize an online trace-driven simulation to detect faults and perform root cause analysis. The simulation may be utilized to reproduce events that took place in the network which resulted in a fault, and therefore identify and rectify these faults.

Figure 1:
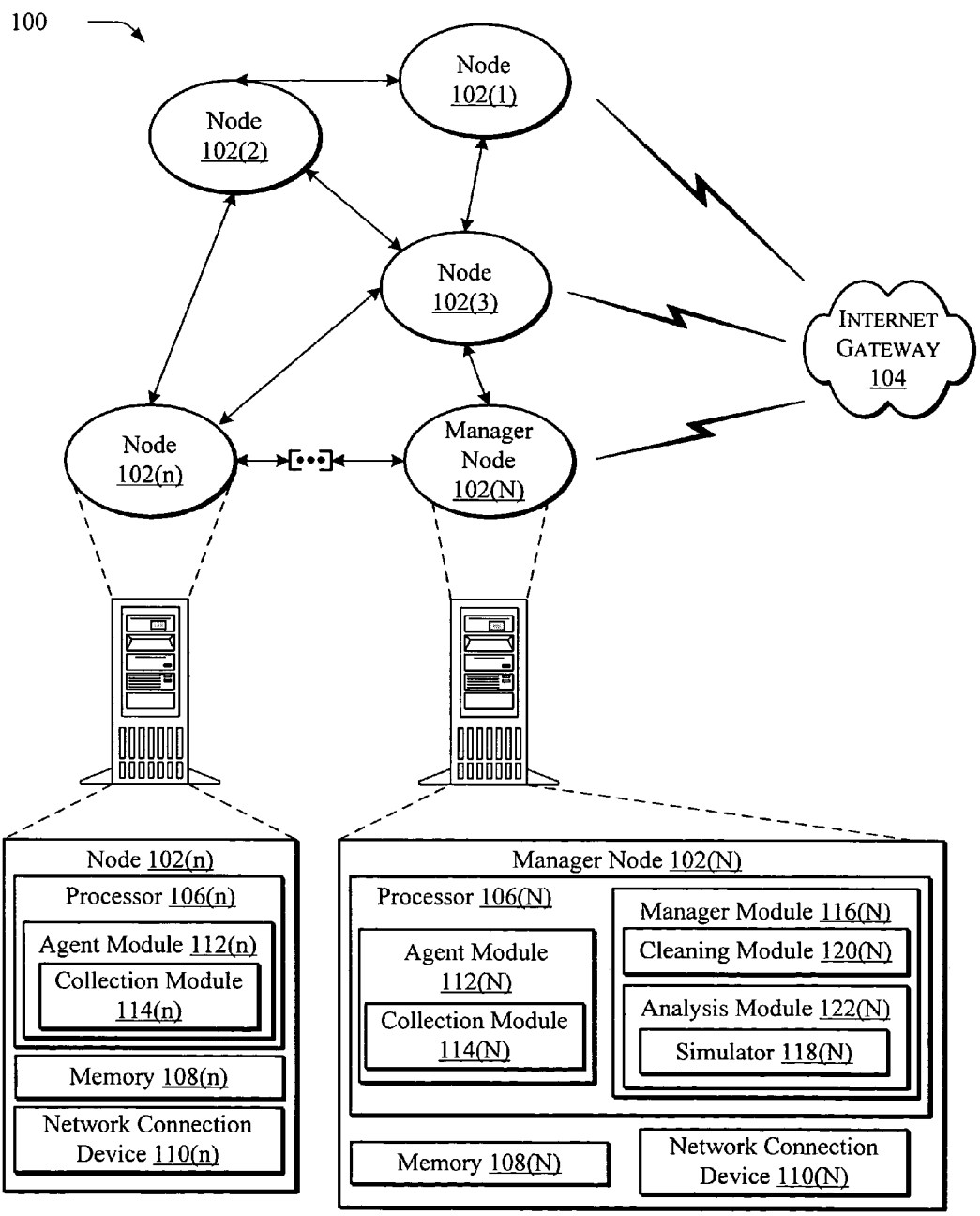
FIG. 1 is an illustration of an environment in an exemplary implementation showing a network having a plurality of nodes.

FIG. 1 is an illustration of an environment in an exemplary implementation showing a network 100 having a plurality of nodes 102(1), 102(2), 102(3), . . . , 102(*n*), . . . , 102(N). The plurality of nodes 102(1)-102(N) of FIG. 1 implements an exemplary framework that utilizes a simulation of the network 100 for fault detection, diagnosis, and what-if analysis. This framework has a variety of beneficial properties. First, the framework is flexible. Since a simulation is highly customizable and can be applied to a large class of networks implemented in different environments, fault diagnosis built on top of the simulator may be configured to inherit this flexibility. Second, a simulation enables a variety of complicated interactions to be captured. For instance, interactions may be captured within the network, between the network and the environment, as well as among different faults that occur during the operation of the network. Therefore, the framework, through use of the simulation, provides for systematic diagnosis of a wide range of faults, including combinations thereof. Third, the framework is extensible in that the ability to detect new faults can be built into the framework by modeling the faults in the simulation independent of the other faults in the system. Interaction between the new faults and preexisting faults that are modeled in the framework is captured implicitly through execution of the simulation. Fourth, reproduction of the network inside a simulator facilitates what-if analysis, which provides quantitative feedback on the performance impact of modifications that may be made to the network. For example, corrective actions may be taken to correct a fault in the operation of a network, a modification may be made to increase performance of a network, and so on.

The framework may utilize one or more of a variety of existing network simulators to simulate the network 100, such as QUALNET (QUALNET is a trademark of Scalable Network Technologies, Inc. of Los Angeles, Calif.), OPNET MODELER (OPNET MODELER is a trademark of OPNET Technologies, Inc. of Washington D.C.), and so on. The traces that are provided to the simulators are obtained from the network being diagnosed, i.e. a "real" network. Use of traces from the real network removes the dependency of the framework on generic theoretical models that may not capture the nuances of the hardware, software, and environment of the particular network in question, thereby improving the accuracy of the framework.

The framework may also employ a fault diagnosis scheme to perform root cause analysis. For instance, the scheme may utilize estimated network performance data emitted by the online trace-driven simulator as the baseline for expected performance of the real network. Deviation from the expected performance is then utilized to indicate a potential fault. Further, the scheme may selectively inject a set of candidate faults into a simulator to perform root-cause analysis by reducing fault diagnosis to a problem of searching a set of faults. A root cause may therefore be identified based on the faults that, when injected, cause the simulation to approximate the observed performance of the real network. Therefore, the framework may employ a search algorithm to detect and diagnose faults such as packet dropping, link congestion, external noise sources, MAC misbehavior, and so on. These faults may have relatively long lasting impact on performance, and are more difficult to detect than fail-stop errors, such as when a node turns itself off due to power or battery outage.

In this way, the framework may utilize a simulation as an analytical tool for troubleshooting and testing of alternative and potentially performance-enhancing configurations in a network. In the following sections, network traces are identified which, when provided to a simulator, provide a network simulation that gives an accurate depiction of actual network behavior. A technique is also described that reduces or eliminates erroneous data from the trace, further discussion of which may be found in relation to FIGS. 8 and 9. Consequently, the simulator is supplied with high-quality data. Additionally, a search algorithm is described which is effective for diagnosing multiple faults in the network, further discussion of which may be found in relation to FIG. 7. The simulator can also be used to carry out what-if analysis and quantify the performance benefit of possible actions on the current network, further discussion of which may be found in relation to FIGS. 10-13.

The troubleshooting framework may be employed in a wide variety of network configurations. One such example is illustrated by the network 100 of FIG. 1, which is depicted as a wireless mesh network. A mesh network can employ a variety of arrangements, such as full mesh topology or a partial mesh topology. In a full mesh topology, each node is directly connected to each other node in the network. In a partial mesh topology, each node is connected to at least one other node, but not necessarily to each other node in the network.

A mesh network, for instance, may be utilized as an enabling technology for neighbors to collaboratively form a self-managed community wireless mesh network. Each neighbor may provide one or more of the plurality of nodes 102(1)-102(N) of the network 100. With such a network, neighbors can, for example, share an Internet gateway 104 in a cost-effective way.

In an example of a mesh network as utilized in a neighborhood, routers which are utilized to communicatively couple the plurality of nodes 102(1)-102(N) reside inside a home and are plugged in electrical outlets. Therefore, each of the routers in this example has limited mobility. The relative stability of such a network, however, makes network troubleshooting even more important because faults might have lasting influence on network performance. It should be noted that the lack of router mobility in this example does not take away the dynamism in the network topology because wireless links can be accessible or inaccessible due to environmental changes. In another example, nodes of the mesh network may be mobile, such as through use of mobile computing devices having wireless communication capabilities, such as personal digital assistants (PDA), tablet personal computers (PCs), laptop computers, and so on.

Additionally, growth of a community mesh network is organic (i.e., flexible) as users buy and install equipment to join the mesh network. Traditional mesh networks had a lack of a centralized entity responsible for network administration. However, the self-manageability and self-healing capabilities provided through the framework described herein may be provided such that each node 102(1)-102(N) implements troubleshooting capabilities. In the illustrated implementation, a single node is provided having centralized management capabilities.

In the network 100 illustrated in FIG. 1, each of the nodes has a processor, memory, and a network connection device, an example of which is shown by node 102(n) as including a processor 106(n), memory 108(n), and a network connection device 110(n). Processors (e.g., processors 106(n), 106(N)) are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a node, may include, but are not limited to, quantum computing, optical computing, mechanical computing (e.g., using nanotechnology), and so forth.

Memory (e.g., memory 108(n), 108(N)) includes computer storage media in the form of volatile and/or nonvolatile memory such as read only memory (ROM), random access memory (RAM), and so on. Memory may also include other removable/non-removable, volatile/nonvolatile computer storage media. Memory provides storage of computer-readable instructions, data structures, software components, and other data for nodes.

The network connection devices (e.g., network connection devices 110(n), 110(N)) may assume a variety of configurations for communicatively coupling the nodes to the network 100. When used in a local area network (LAN) environment, for instance, the node 102(n) is communicatively connected to the LAN through a network interface or adapter, which may be wired and/or wireless. When used in a wide area network (WAN) environment, the network connection device may be configured as a modem or other means for establishing communications, such as a wired connection over a digital subscriber line (DSL), a wireless connection provided with a satellite, and so on. Logical connections are depicted in FIG. 1 through the use of arrows. Although the network 100 shown in FIG. 1 is a wireless mesh network, a variety of other networks may be employed, such as the Internet, intranets, and so on.

Nodes 102(n), 102(N) illustrate an exemplary management architecture composed of software modules. Generally, any of the functions described herein can be implemented using software, firmware (e.g., fixed logic circuitry), manual processing, or a combination of these implementations. The terms "module," "functionality," and "logic" as used herein generally represents software, firmware, or a combination of software and firmware. In the case of a software implementation, the module, functionality, or logic represents program code that performs specified tasks when executed on a processor, such as one or more central processing units (CPUs). The program code can be stored in one or more computer readable memory devices. The features of the framework described below are platform-independent, meaning that the troubleshooting techniques may be implemented on a variety of commercial computing platforms having a variety of processors.

An agent module 112(n) is provided for execution on each node 102(n) of the network 100. The agent module 112(n) is illustrated as being executed on the processor 106(n) and is storable in memory 108(n). The agent module 112(n) includes a data collection module 114(n) (hereinafter "collection module") that, when executed, may gather data from various protocol layers and/or from the network connection device 110(n). In the illustrated network 100 of FIG. 1, the agent module 112(n) then reports this data to the node 102(N) having management functionality, which hereinafter will be referenced as a manager node. The manager node 102(N) performs an analysis of the data (e.g., through implementation of a simulation that accepts the data as an input) and takes appropriate actions for troubleshooting the network. Management of the network can be centralized by placing the manager on a single node as illustrated in the network 100 of FIG. 1, or distributed such that a plurality of the nodes of a network each include management functionality.

The agent modules 112(n), 112(N), when executed on the respective processors 106(n), 106(N), collect and communicate data describing their (local) view of the network's behavior to the manager node 102(N). Examples of the data sent may include traffic statistics, received packet signal strength on various links, retransmission counts on each link, and so on.

The manager node 102(N) includes a manager module 116(N) that is storable in the memory 108(N) and executable on the processor 106(N) to process the data from the agents 112(n), 112(N) for troubleshooting the network 100. The manager module 116(N), for instance, includes a network simulator 118(N) (hereinafter, "simulator") that is executable on the processor 106(N) and storable in the memory 108(N) to simulate the network 100.

Data received by the manager node 102(N) from the various agents 112(n), 112(N) may result in an inconsistent view of the network 100. Such inconsistencies can be the result of topological and environmental changes, measurement errors, misbehaving nodes, and so on. Therefore, the manager node 102(N) includes a data cleaning module 120(N) (hereinafter "cleaning module") that is executable on the processor 106 (N) to resolve such inconsistencies. Cleansed data output from cleaning module 120(N) is then provided for processing by a root cause analysis module 122(N) (hereinafter "analysis module"), further discussion of which may be found in relation to the following figure. Although the manager node 102 (N) is illustrated as including the agent module 112(N) and the manager module 116(N), in another implementation the manager node 102(N) is a dedicated manager node in that it does not include the agent module 112(N). Also, as previously described, the functionality of the manager module 116(N) may be provided by more than one node in the network 100.

Figure 2:
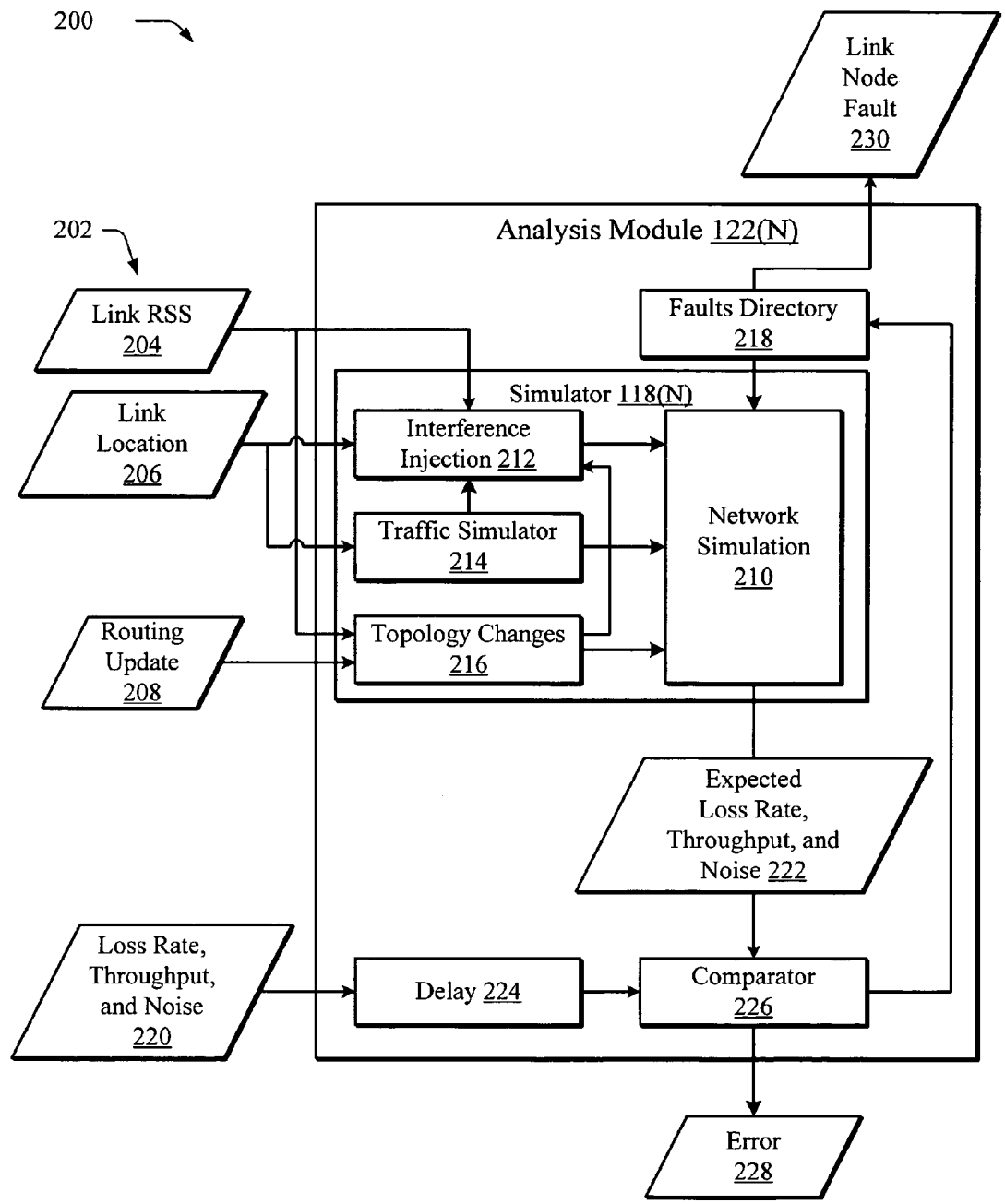
FIG. 2 is an illustration of an exemplary implementation showing an analysis module of FIG. 1 in greater detail.

FIG. 2 is an illustration of an exemplary implementation 200 showing the analysis module 122(N) of FIG. 1 in greater detail. Once inconsistencies in the data have been resolved by the cleaning module 120(N) of FIG. 1, the cleansed data is fed into the analysis module 122(N) for further investigation.

The analysis module 122(N) utilizes an online trace-driven simulation to determine root causes of discrepancies from expected network performance as indicated by the simulated network perform. In the following discussion, expected network performance and simulated network performance are utilized interchangeably to indicate network performance as provided by a network simulation. The analysis module 122 (N) may utilize cleansed data 202 obtained from a trace utility, examples of such data are illustrated in FIG. 2 as link received signal strength (RSS) 204, link location 206, and routing update 208, to drive online simulations and establish the expected performance under the given network configuration and traffic patterns.

The analysis module 122(N) is illustrated as including a network simulation 210 that is provided through execution of the simulator 118(N). The network simulation 210 may be provided by execution of one or more software modules that provide simulations of characteristics of a network, examples of which are illustrated in FIG. 2 by an interference injection module 212, a traffic simulator module 214, and a topology change module 216. The interference injection module 212 is executable to simulate external noise sources by injecting the effect of external noise on the network simulation 210. The traffic simulator module 214 is executable to ensure that traffic of the network simulation 210 approximates that of the real network. The topology change module 216 is executable to simulate changes to the topology, such as by adding and/or removing nodes in the network simulation 210.

The analysis module 122(N) detects faults in the network 100 of FIG. 1 by comparing the expected performance as indicated by the network simulation 210 with the observed performance. When discrepancies are observed, the analysis module 122(N) determines the root cause for the discrepancies by searching for one or more faults stored in a faults directory 218 that result in the best match between the simulated and observed network performance.

The analysis module 122(N), for example, may receive observed data 220 from one or more of the agent modules 112(n) of FIG. 1 which describes a loss rate, throughput, and noise 220, which is illustrated in FIG. 2 as "loss rate throughput noise 220". The network simulation 210 computes expected data 222 that describes an expected loss rate, an expected throughput, and expected noise, which is illustrated in FIG. 2 as "expected loss rate throughput noise 222". The observed data 220 is communicated through a delay 224 to a comparator 226 such that the comparator 226 receives the observed and expected data 220, 222 simultaneously. The comparator 226 then determines whether the observed data 220 exceeds the expected data 222. If so, the comparator 226 outputs an error message 228 for communication to the network administrator and communicates the error to the faults directory 218 to determine a root cause of the error.

After the root cause of the error has been identified through selection of one or more of the faults from the faults directory 218, the analysis module 122(N) may simulate one or more alternative actions for rectifying the fault. The alternative actions may be simulated under the current traffic pattern and network topology as provided by the traffic simulator 214 and topology change module 216, respectively. Based on the simulations, the analysis module 122(N) may suggest one or more appropriate actions to alleviate the faults and enhance overall performance of the network, an example of which is illustrated by the link node fault 230 of FIG. 2. For example, the network administrator can be notified if the software or hardware are suspected as faulty, the topology can be changed via transmission-power adjustment if poor connectivity is detected, the routers can employ rate limitations to alleviate congestion, and so on.

Use of the network simulation 210 for online diagnosis offers a variety of benefits over traditional heuristic or theoretical diagnostic techniques. For instance, the network simulation 210 can provide increased insight into the behavior of the network over traditional heuristic or theoretical techniques. An operational wireless network, for example, is a complex system having intricate pieces, such as traffic flows, networking protocols, signal processing algorithms, hardware, radio frequency (RF) propagation and so on. Additionally, interactions may occur between all of the pieces of the network. Interactions between faults may be effectively diagnosed and addressed through selection of one or more faults from the faults directory 218 that result in a network simulation 210 that corresponds to the actual behavior of the "real" network.

Further, network behavior may be governed by node interaction, one to another, as well as by external noise sources positioned in the vicinity of the nodes. Traditional heuristic or theoretical techniques do not capture the behavior of such networks and do not adequately address interaction between the different components of the network.

Figure 3:
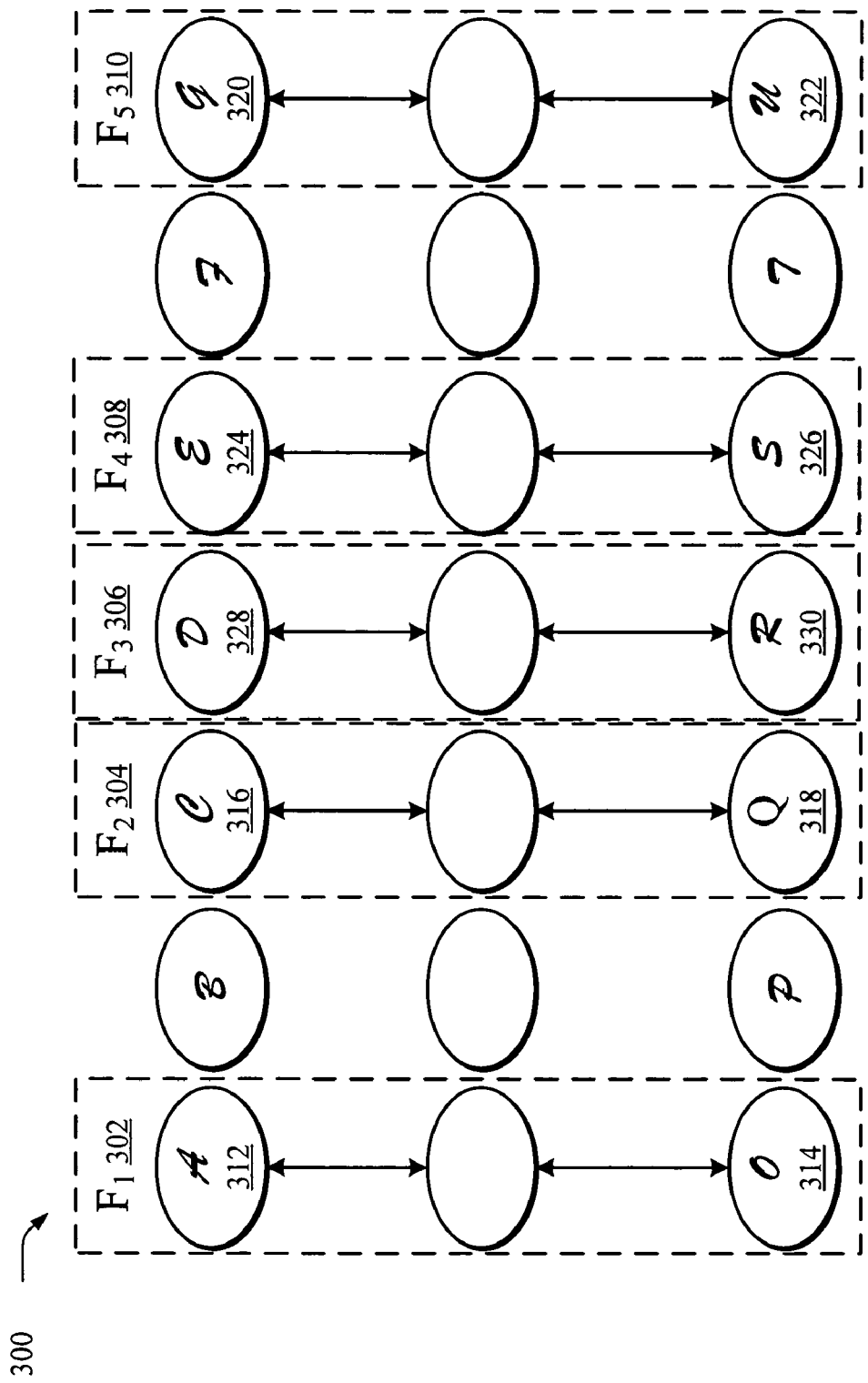
FIG. 3 is an illustration of a network having a seven-by-three grid topology.

As an example, consider a seven-by-three grid topology network 300 shown in FIG. 3. Five flows are illustrated in the network 300 and are denoted as $F_1$ 302, $F_2$ 304, $F_3$ 306, $F_4$ 308, and $F_5$ 310. In the illustrated example, each of the flows 302-310 has a similar amount of traffic to communicate. For example, each of the flows 302-310 may receive substantially similar amounts of data from respective applications.

Additionally, in this example, adjacent nodes can "hear" one another and the interference range is twice the communication range. Traffic between node A 312 and node O 314, for instance, interferes with the traffic between nodes C and Q 316, 318. Similarly, traffic between nodes G and U 320, 322 interferes with the traffic between nodes E and S 324, 326. However, traffic between G and U 320, 322 and traffic between nodes A and O 312, 314 do not interfere with traffic between nodes D and R 328, 330.

The following table describes an example of throughput of the flows 302-310 when each flow sends constant bit rate (CBR) traffic at a rate of eleven Mbps.

| $F_1$ | $F_2$ | $F_3$ | $F_4$ | $F_5$ |
| --- | --- | --- | --- | --- |
| 2.50 Mbps | 0.23 Mbps | 2.09 Mbps | 0.17 Mbps | 2.53 Mbps |

As shown in the above table, flow $F_3$ 306 receives a higher throughput than the flows $F_2$ 304 and $F_4$ 308. In other words, flow $F_3$ 306 consumes a higher portion of the bandwidth than the other flows of the network 300.

Traditionally, application of heuristic techniques may have lead to a conclusion that flow $F_3$ 306 receives an unduly larger share of the bandwidth. Through use of an online trace-driven simulation, however, the manager node 102(N) may conclude that this is normal behavior. For example, the network simulation may take link quality into account and therefore determine that flows $F_1$ 302 and $F_5$ 310 interfere with flows $F_2$ 304 and $F_4$ 308. Therefore, flow $F_3$ 306 is provided with additional bandwidth because of the lack of interference from flows $F_1$ 302 and $F_5$ 310, as opposed to flows $F_2$ 304 and $F_4$ 308. In this way, the simulation can determine that even though all the flows may have the same application-level sending rate, the observed throughput is expected. A simple heuristic, however, may come to an erroneous conclusion that nodes D and R 328, 330 are misbehaving.

The network simulation is utilized by the analysis module 122(N) to manage the network by knowing "what to expect" from the network given the current traffic flows and link qualities. In other words, the analysis module 122(N) can comment on what constitutes normal behavior based on estimations provided by the network simulation. In the previous example, even though $F_3$ 306 utilizes a greater share of the bandwidth of the network 300 than other flows in the network 300, this will not be flagged as a fault by the manager module because this behavior is expected. When the observed behavior deviates from the expected behavior, the manager module can invoke the fault search algorithms that utilize the faults directory 218 of FIG. 2 to determine the root cause of the deviation.

In addition, while it might be possible to apply traditional signature-based or rule-based fault diagnosis approach to a particular type of network arid under a specific environment and configuration, simple signatures or rules are insufficient to capture the intrinsic complexity for fault diagnosis in general settings. In contrast, a simulator is highly customizable and may be applied, with appropriate parameter settings, to a large class of networks that are configured for use in different environments. Fault diagnosis built on top of such a simulator inherits this generality.

Yet another advantage of simulation-based approach is the ability to perform what-if analysis. That is, by modifying the settings or performing certain actions in the simulator, a simulator can predict performance for an imaginary scenario. Based on this data, a manager module can instruct the agent modules (e.g., agent module 112(n) of FIG. 1) to take an appropriate action to optimize the performance of the network. As previously described, such what-if analysis is valuable because it may be difficult to foresee the consequences of a corrective action due to the interaction of multiple factors in a network. For example, transmitter power may be increased to improve link quality, but the increase may also create additional interference that affects other nodes in the network.

Fault Detection and Diagnosis

A simulation-based diagnostic approach is described which provides for creation of an environment inside a simulator (e.g., network simulation 210) that approximates the functionality of a real network. The created environment (i.e., the network simulation) may then be utilized to determine expected behaviors of the real network as well as determine when discrepancies in the operation of the real network occur. To find a root cause of these discrepancies, the manager module is executed to search over a fault space to determine which fault or set of faults can reproduce network performance which approximates the network performance that is observed in the real network. The simulated network may reproduce a variety of network aspects, such as network topology, routing behavior, traffic patterns observed in the real network, and so on.

Using online trace-driven simulation as a building block, a diagnostic algorithm is described which is executable to find root-causes for faults. The diagnostic algorithm, for instance, may first estimate performance of the network under a given set of faults. Then, based on differences between the estimated and observed performance, the diagnostic algorithm searches a fault space to reproduce any observed discrepancies. In an implementation, the diagnostic algorithm can diagnose multiple faults of the same type (e.g., network topology), as well as diagnose the presence of multiple types of faults (e.g., noise and topology).

Faults may be diagnosed even when the trace data used to drive the simulation contains errors. For example, data provided by the agent module 112(n) of FIG. 1 may contain errors due to a variety of reasons, such as measurement errors, false information, software/hardware errors in the execution of the node 102(n), network communication errors, and so on. The cleaning module 120(N) is executed by the manager node 102(N) to reduce or eliminate erroneous data from the trace such that quality trace data is utilized to drive the simulation-based fault diagnosis. Further discussion of cleaning module 120(N) execution may be found in relation to FIGS. 8-9.

Trace-Driven Simulation

Figure 4:
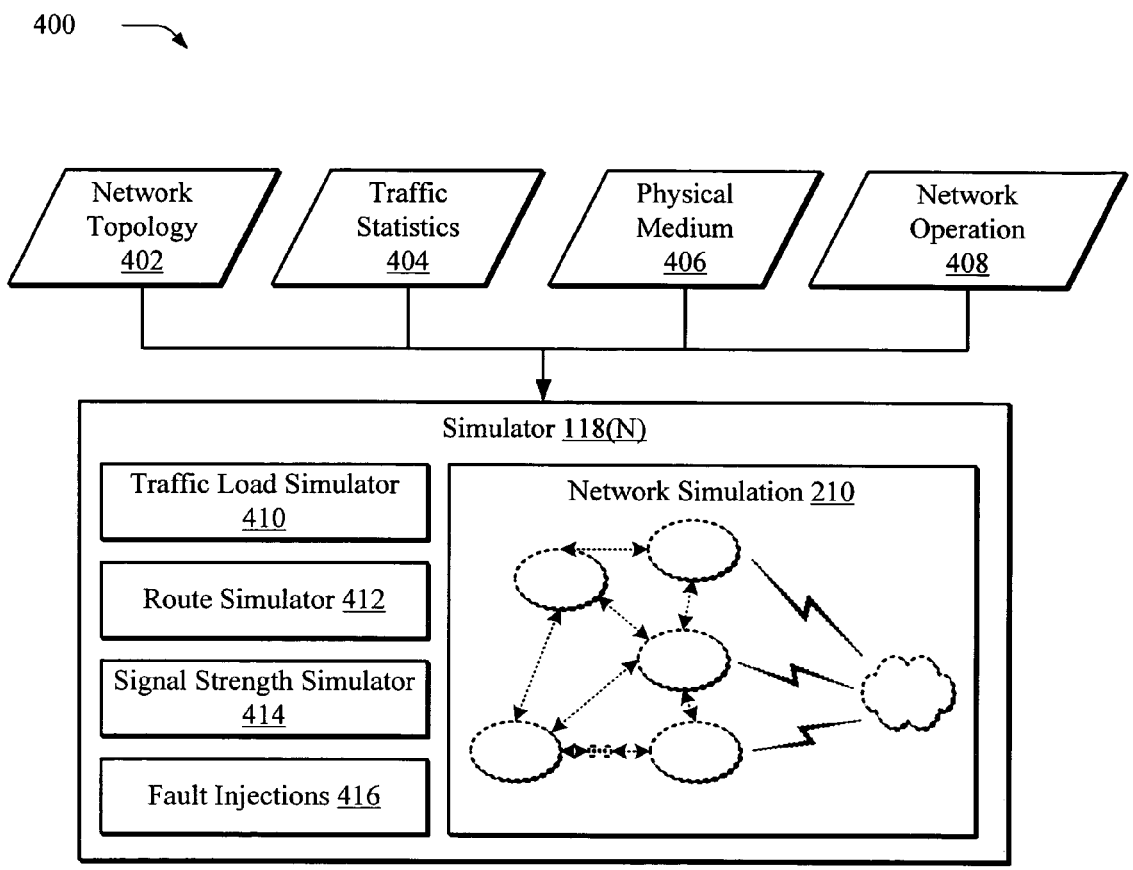
FIG. 4 is an illustration of an exemplary implementation showing a system that includes a simulator and a network simulation of FIG. 2.

FIG. 4 is an illustration of an exemplary implementation showing a system 400 that includes the simulator 118(N) and the network simulation 210 of FIG. 2. Trace data obtained through operation of a real network enables the simulator 118(N) to accurately represent network operation of the real network and examine the effects of a given set of faults on the real network. A variety of trace data may be collected for input to a simulator, examples of which are described as follows:

Network Topology 402

Network topology 402 data describes the topology of the network, such as which nodes are currently members of the network and corresponding links between the nodes. Each node in the network, for instance, may be configured to report on the status (e.g., connected or disconnected) of neighboring nodes and nodes referenced in one or more routing tables of the node. In this way, node membership in the network may be communicated to the manager node 102(N) of FIG. 1. In an implementation, only changes in neighbors or routes are reported. This data may be used to drive a route simulation, which is described in greater detail in relation to a route simulator of FIG. 4

Traffic Statistics 404

Traffic statistics 404 data may be utilized to describe amounts of data that is communicated through the network and particular nodes that communicate that data. The traffic statistics 404 may be utilized as an input by the traffic simulator module 214 of FIG. 2 such that the network simulation 210 has a traffic flow which approximates that o the real network. Each node of the network may maintain one or more counters which describe the volume of traffic sent to and received from its immediate neighbors. This data is used to drive a route traffic simulation provided by the traffic simulation module 214, which is also described in greater detail in relation to FIG. 4.

Physical Medium 406

Physical medium 406 data may describe effects on network performance of the physical medium that is utilized to implement the network. For example, in a wireless network each node may report its noise level and the signal strength of the wireless links from its neighboring nodes. In an implementation, variations in signal strength are periodically captured through time averaging, standard deviation, or other statistical aggregate.

Network Operation 408

Network operation 408 data describes network operation 408 of the real network. As previously described, observed network operation is compared with the estimated network operation output from the network simulation to detect network operation discrepancies. Network operation may include both link operation and end-to-end operation, both of which can be measured through a variety of metrics, such as packet loss rate, delay, and throughput. The following description focuses on link level operation.

Data collection may involve two steps: (1) collecting raw performance data at a local code and (2) distributing the collected data to collection points for analysis. A variety of tools may be utilized for local data collection, such as native routing protocols and packet sniffers.

In an implementation, even though distribution of data to the manager module introduces network overhead, the network overhead is low and has little impact on the data traffic in the network. Additionally, network overhead may be reduced by using compression, delta encoding, multicast, adaptive changes of a time scale and/or spatial scope of distribution, and so on. For example, a minimum set of data is collected and exchanged during normal operation of a network. Once a need arises for additional data (e.g., when the information being collected indicates a discrepancy), the manager module may request additional information and increase the frequency of data collection for the subset of the nodes that need increased monitoring.

Simulation Methodology

Network characteristics that are modeled by the simulator may be classified in a variety of categories, such as traffic load, routing, wireless signal, faults, and so on. The following sections describe simulation examples of each of these exemplary categories as individual modules that are utilized to cause the simulator to simulate the corresponding network characteristics.

Traffic Load Simulator 410

A network simulation generated by a simulator may be configured such that it provides a traffic pattern that approximates the traffic pattern of the real network. An example of a traffic load simulation approach involves the simulation of end-to-end application demands. However, an N-node network can include potentially $N^2$ demands. Moreover, end-to-end application demands may be difficult to obtain given the heterogeneity of application demands and the use of different transport protocols, such as a transmission control protocol (TCP), a user datagram protocol (UDP), a rapid transport protocol (RTP), and so on.

In an implementation, a traffic load simulator 410 module is a portion of the traffic simulator module 214 of FIG. 2 and provides a link-based traffic simulation that is utilized for scalability and to avoid the need for obtaining end-to-end application demands. The link-based traffic simulation, when implemented, may adjust an application-level sending rate at each link to match the observed link-level traffic counts of the real network. In this way, higher layers (e.g., a transport layer, an application layer, and so on) are abstracted away, which allows the simulation to concentrate on packet size and traffic rate.

Matching the sending rate on a per-link basis in a simulator may be nontrivial when the sending rate on a link cannot be directly controlled, such as when only the application-level sending rate may be adjusted and the medium access control (MAC) protocol must be addressed. For example, when an application sending rate of a link is set at one Mbps, the actual sending rate (on the air) can be lower due to back-off at the MAC layer, or higher due to MAC level retransmission. The issue is further complicated by interference, which introduces interdependency between sending rates on different links.

An iterative search technique may be utilized to address these issues by determining the sending rate at each link. A variety of iterative search techniques may be utilized, such as (i) multiplicative increase and multiplicative decrease, and (ii) additive increase and additive decrease. As shown in the following procedure depicted using exemplary pseudo-code, each link individually tries to reduce the difference between the current sending rate in the simulator and the actual sending rate in the real network.

```
while (not converged and i < maxIterations)
    i = i + 1
    If (option = = multiplicative)
        for each link (j)
            prevRatio = targetMacSent(j)/simMacSent(J);
            currRatio = (1 − α) + α* prevRatio;
            simAppSent(J) = prevAppSent(j) * currRatio;
    else // additive
        for each link (j)
            diff = targetMacSent(j) = prevMacSent(j);
            currAppSent(j) = prevAppSent(j) + α* diff;
    run simulation using simAppSent as input
    determine simMacSent for all links from simulation results
    conveyed = isConverge (simMacSent, targetMacSent)
```

Thus, the above pseudo-code illustrates an example of search for application-level sending rate using either multiplicative-increase/multiplicative-decrease or additive-increase/additive-decrease. In the above exemplary procedure, a parameter α is introduced, where $α \leqq 1$ (e.g., α=0.5), to dampen oscillation. The process reiterates until either the rate approximates the target rate (denoted as targetMacSent) or a maximum number of iterations is reached.

Route Simulator 412

Routing plays an important role in network performance, particularly in multi-hop wireless networks. One route simulation approach involves the simulation of a routing protocol used in the real network inside the simulator. In order to reproduce the same routing behavior as in a real network, detailed traces of packets are obtained to set up the routing.

The actual routes taken by packets may be utilized as an input to the route simulator 412 module. When routes do not frequently fluctuate, routing changes may be tracked instead of collecting routes on a packet-by-packet basis at the manager. For this purpose, the route simulator 412 module may be trace-driven. For example, the route simulation module may be implemented inside the simulator 118(N), such as a QUALNET simulator (QUALNET is a trademark of Scalable Network Technologies, Inc. of Los Angeles, Calif.). The route simulation 412 module accepts routing updates and corresponding timestamps as inputs, and then ensures that the packets in the network simulation follow the same route as in the real network.

Signal Strength Simulator 414

Signal strength has an impact on both wired and wireless network performance. Due to variations across different network connection devices (e.g., wireless cards) and environments, a general propagation model may be difficult to derive which captures all of these factors. To address this issue, the signal strength simulator 414 may be driven from real measurement of signal strength in the real network, such as obtained from the network connection devices themselves.

Fault Injection 416

The framework may include a fault injection 416 module that is executable to inject different types of faults into the simulator, such as packet dropping at hosts, external noise sources, MAC misbehavior, and so on. In this way, the analysis module may examine the impact of faults on the network. Packet dropping at hosts, for instance, occurs when a misbehaving node drops a portion of the traffic from one or more neighboring nodes, such as due to hardware/software errors, buffer overflow, malicious drops, and so forth. The ability to detect such end-host packet dropping is useful, since it allows the manager to differentiate losses caused by end hosts from losses caused by the network.

The framework, through execution of the fault injection 416 module, also supports the ability to inject external noise sources in the network. Thus, the framework may provide a simulation that replicates the effect of noise sources that lie outside the network (i.e., are not provided by a node) but nevertheless affect the network.

MAC misbehavior occurs when a faulty node does not follow the MAC etiquette and obtains an unfair share of the channel bandwidth. For example, in IEEE 802.11, a faulty node can choose a smaller contention window (CW) to aggressively send traffic.

Link congestion may also be simulated by the framework by supplying a high data transmit load on the simulated network. Unlike the other types of faults, link congestion is implicitly captured by the traffic statistics gathered from each node. Therefore, the trace-driven simulation can directly assess the impact of link congestion on the real network. Further discussion of fault diagnosis may be found in the following section.

Fault Diagnosis

Root causes for failures and performance problems may be diagnosed through execution of the analysis module 122(N) of FIG. 2. By applying faults to a network simulation, diagnosis of network discrepancies may be reduced to searching for a set of faults that, when injected into the simulated network, result in an estimated performance by the simulated network that approximates the observed performance of the real network. More formally, given network settings NS, FaultSet is found such that:

$$SimPerf (NS; FaultSet) \approx RealPerf$$

where the network performance is a functional value that can be quantified using a variety of different metrics.

The search space for a fault may contain a multitude of searching dimensions due to the different combinations of faults which may be encountered. In an implementation, the analysis module 122(N) is optimized for efficient searching due to a realization that different types of faults often change a few particular network performance metrics. For example, packet dropping at hosts generally affects link loss rate, but does not affect other network performance metrics. Therefore, network performance metrics may be used to diagnosis network performance by noting differences between observed and estimated network performance indicated by the metrics.

In an implementation, it is not necessary to provide a predictive model for the purpose of fault diagnosis. Rather, it is sufficient to simulate what happened in the network after the fact. For instance, agent modules may periodically report information about link conditions and traffic patterns to the manager module. This information is processed and then fed into the simulator to create a network simulation that may then be utilized to determine a likely root cause of the fault.

Initial Diagnosis

Figure 5:
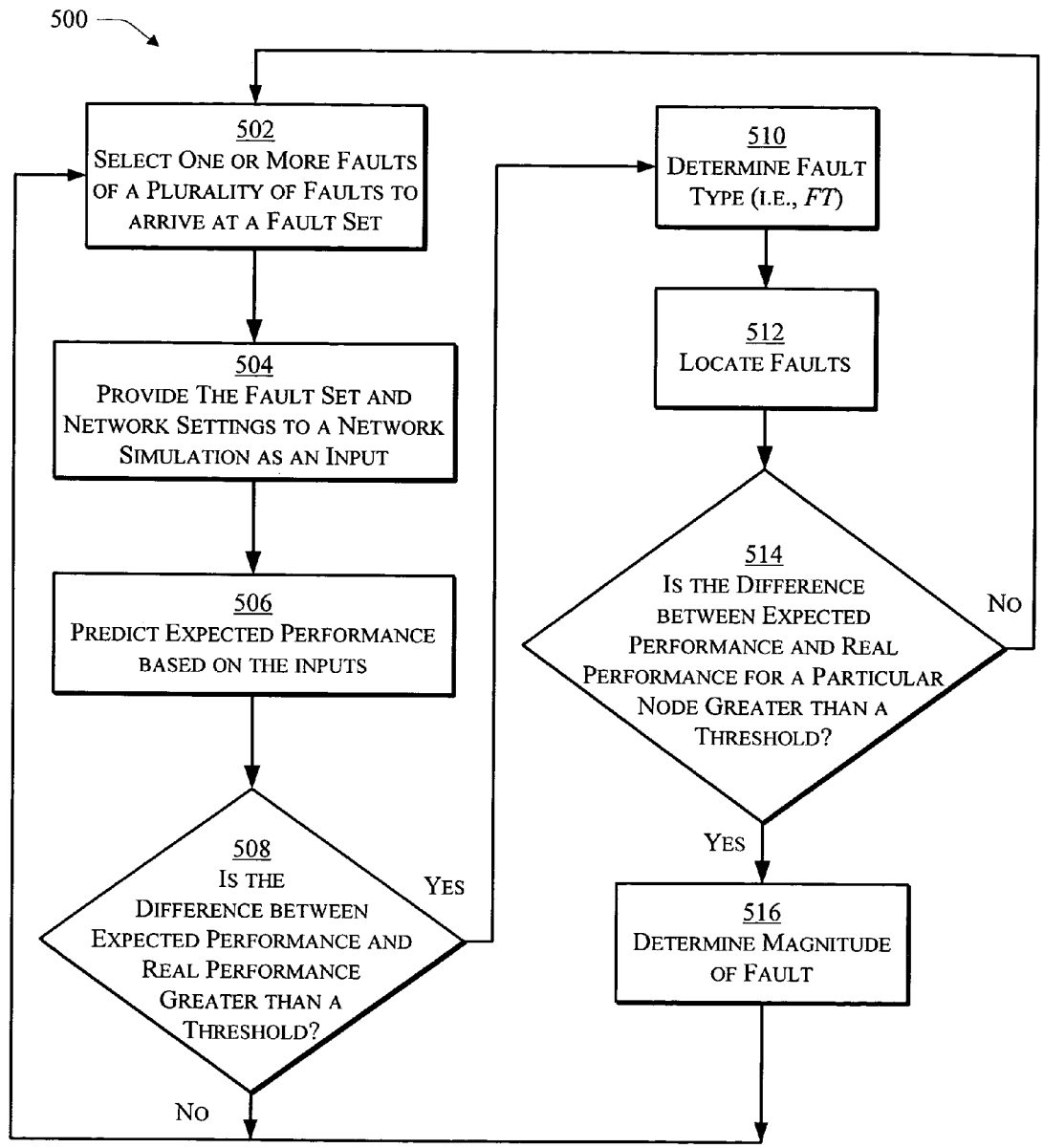
FIG. 5 is a flow chart depicting a procedure in an exemplary implementation in which faults having the same type, one to another, are initially diagnosed.

FIG. 5 is a flow chart depicting a procedure 500 in an exemplary implementation in which faults having the same type, one to another, are initially diagnosed. For ease of description, the following discussion involves three exemplary types of faults: (1) packet dropping at hosts; (2) external noise; and (3) MAC misbehavior. It should be apparent, however, that a wide variety of other faults and fault combinations may also be addressed in a similar manner. The following discussion includes procedures that may be implemented utilizing the described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

As previously described, a trace-driven simulation, when fed with current network settings of a real network, may be utilized to establish estimated network performance of the network. Based on the difference between the estimated network performance and observed network performance, the type of faults may be determined using a decision tree, an example of which is depicted in FIG. 6.

Due to a variety of factors, estimated network performance is unlikely to be identical with the observed network performance, even in the absence of faults. Therefore, discrepancies in network performance may be determined using a threshold. For example, a discrepancy may be determined based on whether a difference between estimated and observed (i.e., real) network performance values exceeds a corresponding threshold. The threshold may be computed in a variety of ways, such as by observing the historical difference between simulated and actual network performance.

Figure 6:
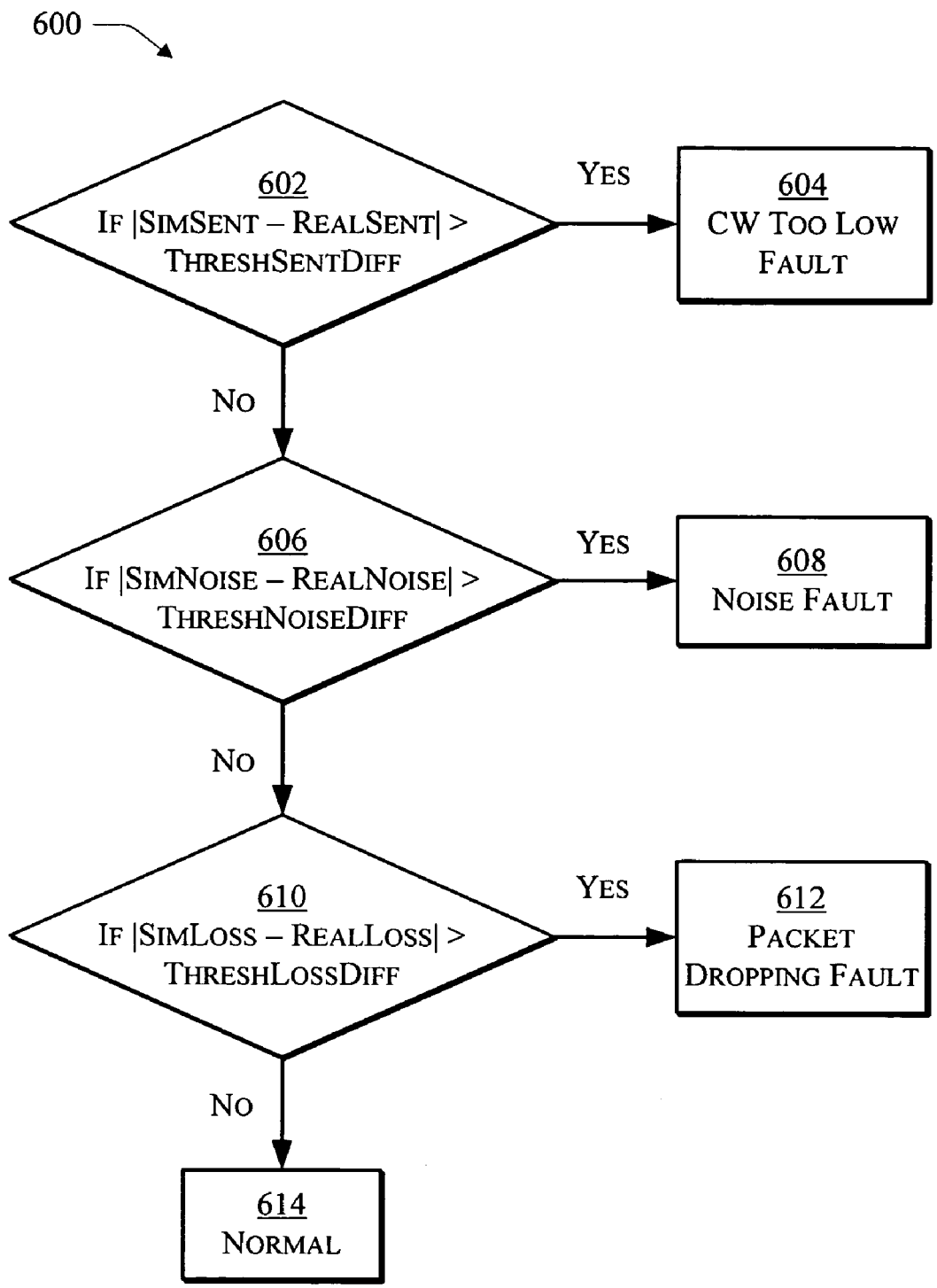
FIG. 6 is an illustration of a decision tree in an exemplary implementation which may be utilized to determine a type of fault based on the difference between the estimated performance and observed performance.

A fault classification scheme, an example of which is depicted in FIG. 6, is configured to determine the type of fault which caused the discrepancy by noting that different faults exhibit different respective behaviors. While the behaviors exhibited by each of the faults may still overlap (e.g., both noise sources and packet dropping at hosts increase loss rates, lowering a contention window increases the amount of traffic and hence increases interference noise, and so on), the faults may first be categorized by checking the differentiating respective behavior. For example, an external noise source increases noise levels experienced by neighboring nodes, but does not increase the sending rates of any node. Therefore, the external noise source can be differentiated from MAC misbehavior and packet dropping at hosts.

Reference will now be made again to FIG. 5. The following discussion includes parentheticals having italicized text which describe alternate notations as utilized in exemplary pseudo-code that is included in the discussion of the related figures. At block 502, the analysis module selects one or more faults from a plurality of faults, such as from the faults directory 218 of FIG. 2. At a first iteration of the procedure 500, none of the plurality of faults is selected to derive an expected performance of the network under normal operating conditions, i.e. without faults. In another implementation, the procedure 500 of FIG. 5 is utilized to perform an initial diagnosis and is not iterative, i.e. it is a "one pass" procedure. In such an implementation, block 502 may be removed from the procedure 500 and the fault set provided as an empty set { }.

At block 504, the fault set (FS) and network settings (NS) are provided to a network simulation as an input. A variety of network settings may be supplied, such as signal strength, traffic statistics, routing tables, and so on. In another implementation, the network settings include data that is selected from the group consisting of network topology, traffic statistics, physical medium, network operation, target end-to-end demands of one or more nodes of the real network, and at least one routing protocol that is utilized in the real network.

At block 506, the expected performance (SimPerf) is predicted by executing the network simulation with the provided inputs. At decision block 506, a determination is made as to whether the difference (Diff) between the expected performance (SimPerf) and the real performance (RealPerf) is greater than a threshold. If the difference is greater than the threshold (block 506), the fault type (FT) is determined (block 510). Further discussion of determination of a fault type may be found in relation to FIG. 6.

After the fault type is determined, the faults are located (block 512) by finding a set of nodes and links that have differences between the observed and expected network performance that exceeds a threshold for that particular fault type (block 514). The fault type determines what network performance metric is used to quantify the performance difference. For instance, packet dropping may be identified by finding links having a significant difference between expected and observed loss rates.

At block 516, the magnitude of the fault is determined. A function (denoted as "g( )"), for instance, may be utilized to map the impact of a fault into a corresponding magnitude. For example, in an end-host packet dropping scenario, the g( ) function is an identity function, since the difference in a link's loss rate can be directly mapped to a change in a packet dropping rate on a link (fault's magnitude). In an external noise fault scenario, the g( ) function is a propagation function of a noise signal.

The following depicts exemplary pseudo-code which may be executed to implement the procedure 500 of FIG. 5, which is shown as follows:

---

Let NS denote the network settings (i.e., signal strength, traffic statistics, routing table)
Let RealPerf denote the real network performance
FaultSet = { }
Predict SimPerf by running simulation with input (NS; FaultSet)
if |Diff (SimPerf, RealPerf)| > threshold
    determine the fault type ft using a decision tree for each link or node i
    if (|Diff$_{ft}$ (SimPerf(i), RealPerf(i))| > threshold)
        add fault(ft, i) with
            magnitude(i) = g(Diff$_{ft}$ (SimPerf (i), RealPerf (i))

---

The pseudo-code describes a diagnostic algorithm which may be utilized to detect whether a fault has occurred. The following procedure is an example of an algorithm which may be utilized to determine the type of the detected fault.

FIG. 6 is a flow diagram depicting a procedure 600 in an exemplary implementation in which a decision tree is utilized to determine a type of fault. The procedure 600 depicted in FIG. 6 may or may not correspond to block 510 of FIG. 5. At decision block 602, a determination is made as to whether the absolute value of a simulated amount of packets sent (SimSent) minus a real amount of packets sent (RealSent) is greater than a threshold denoted as ThreshSentDiff. If so, a fault is sent indicating that the contention window (CW) is set too low (block 604).

If the threshold of block 602 is not exceeded, then at decision block 606, a determination is made as to whether there is a discrepancy (i.e., a threshold noise differential ThreshNoiseDiff has been exceed) between the real noise (RealNoise) indicated on the real network and the expected noise (SimNoise) of the simulated network. If so, a noise fault is determined (block 608).

If the noise threshold has not been exceeded (block 606), then at decision block 610, a determination is made as to whether simulated packet loss (SimLoss), i.e. the expected packet loss, differs from the real pack loss (RealLoss) by more than a threshold loss difference (ThreshLossDiff). If so, a packet dropping fault has been encountered (block 612). Otherwise, the node is operating normally (block 614). It should be apparent that a wide variety of other fault types may also be determined in a similar manner.

Figure 7:
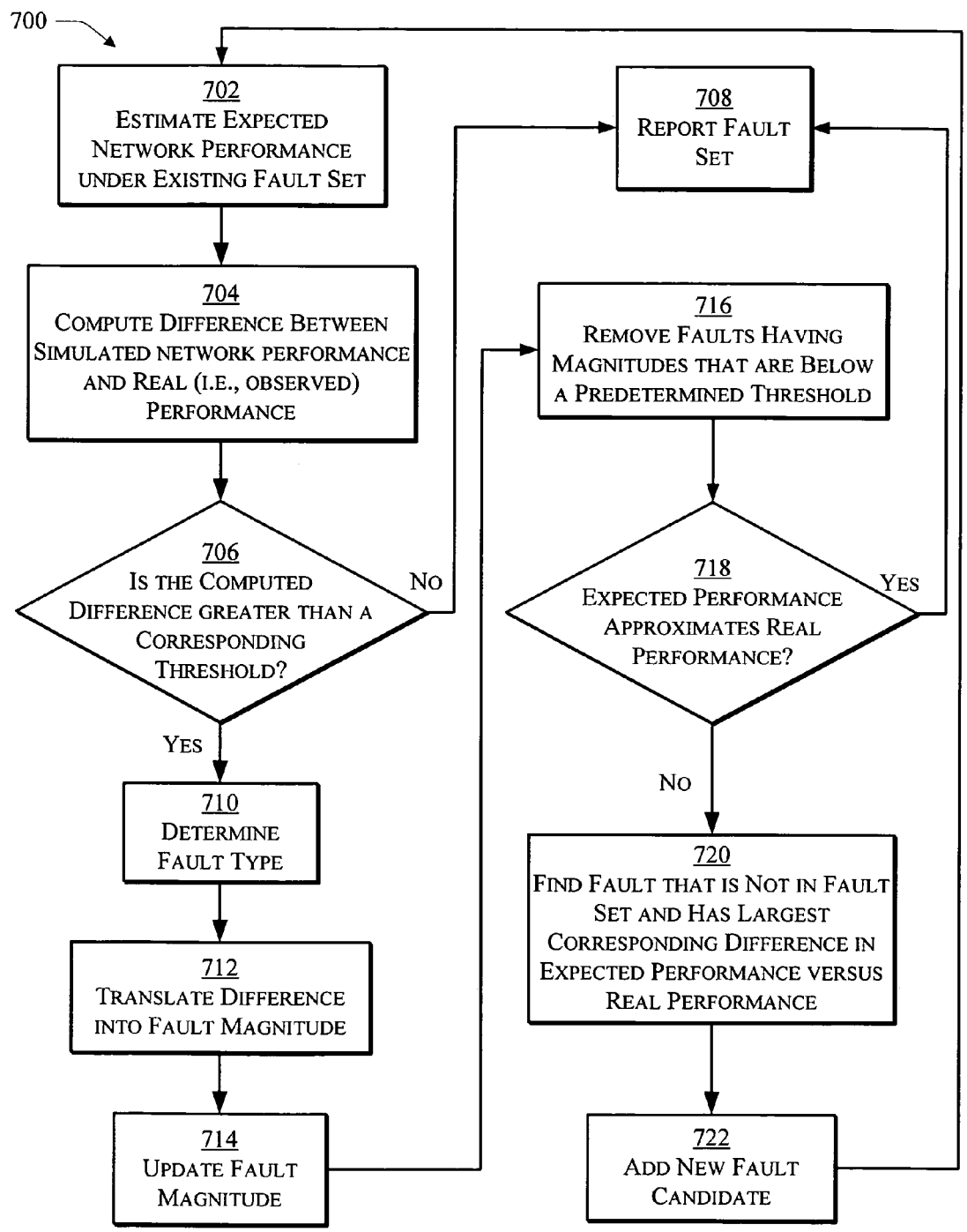
FIG. 7 is a flow chart depicting a procedure in an exemplary implementation in which faults having different types, one to another, are diagnosed using an iterative diagnostic algorithm.

FIG. 7 is a flow chart depicting a procedure 700 in an exemplary implementation in which faults having different types, one to another, are diagnosed using an iterative diagnostic algorithm. In general, multiple types of interacting faults may be encountered in a network. Even when the faults are of the same type, interactions may still be encountered, which may make a one pass diagnostic algorithm insufficient. Therefore, an iterative diagnostic algorithm, as shown in FIG. 7, may be implemented to find root causes. The algorithm includes two stages: (i) an initial diagnostic stage similar to the procedure 500 of FIG. 5, and (ii) iterative refinements.

During the initial diagnostic stage, a one-pass diagnosis algorithm is applied to derive an initial set of faults. During the second stage, the fault set is iteratively refined by (i) adjusting the magnitude of the faults that have been already inserted into the fault set, and (ii) adding a new fault to the set if necessary. The procedure 700 may be reiterated until the change in fault set is negligible, such as when the fault types and locations do not change, the magnitudes of the faults change by minimal amounts, and so on.

An iterative approach may also be used to search for the magnitudes of the faults. At a high level, this approach is similar to the link-based simulation, described in relation to FIG. 5, where the difference between the target and current values were utilized as a feedback to progressively move towards the target.

At block 702, for example, the expected network performance is estimated under the existing fault set for each iteration. For example, the expected network performance may be estimated through simulation of the network using network settings obtained from the real network. The network settings are provided through execution of agent modules on each node. The network settings provided by each node may describe local network performance of the node as well as network performance of neighboring nodes.

At block 704, the difference between estimated network performance (under the existing fault set) and real performance is computed. The difference, for instance, may be computed by a manager node through execution of a manager module. The manager module, when executed, compares the estimated (i.e., expected) network performance obtained from a simulated network with real (i.e., observed) network performance as indicated by additional network settings obtained from the plurality of agents.

The procedure 700 of FIG. 7 first makes an initial fault diagnosis in a manner similar to the procedure 500 described in relation to FIG. 5. At decision block 706, for instance, a determination is made as to whether the computed difference is greater than a corresponding threshold. If not, the fault set is reported (block 708). In this instance, because the computed difference is not greater than the threshold, this indicates to the analysis module that the network is operating normally. If the computed difference is greater than the corresponding threshold (block 706), however, the fault type is determined (block 710). The fault type may be determined in a variety of ways, an example of which was described in relation to FIG. 6.

At block 712, the difference is translated into a change in the fault's magnitudes and the fault magnitudes are adjusted according to the computed change (block 714). For example, the function g( ) as previously described in relation to FIG. 5 may be utilized to compute a fault magnitude for each of the faults based on the respective differences between expected and real network performance. In this way, the faults may be compared, one to another, to determine which fault has an effect on network performance that corresponds to the observed discrepancy. In an implementation, the largest fault magnitude is first utilized to explain the discrepancy, and thereby identify a particular fault which caused the discrepancy. In another implementation, the fault magnitudes are compared to locate a fault which results in a difference which approximates the computed difference. For example, each of a plurality of faults may have respective differences between expected and real network performance. One or more of the faults may be selected by matching the respective differences with the computed difference in network performance. At block 716, faults are removed which have magnitudes which are below a corresponding threshold, thereby optimizing the fault set.

At decision block 718, a determination is made as to whether the expected performance of the network using the current fault set is converging with real network performance. For example, the analysis module may store heuristic data which describes one or more previous iterations of fault sets and resultant performance values in the network simulation. The difference between the target values (i.e., real network performance values) and current values (i.e., simulated network performance values) is used as feedback by the analysis module to progressively "move" the network simulation to approximate the real network.

If the expected performance is not converging with real network performance (block 718), a new fault candidate is added to the fault set (block 720). In addition to searching for the correct magnitudes of the faults, for example, membership in the fault set may be iteratively refined by selecting new fault candidates that can best explain the difference between expected and real network performance (block 722). These new faults are added to the fault set. The fault set including the new fault candidate is then utilized as an input to a network simulation to estimate expected network performance under existing fault set (block 702). In an implementation, a fault is added during each iteration of the procedure 700 which can explain the largest discrepancy, thereby controlling false positives. The procedure 700 may then be repeated until the expected performance of the simulated network approximates the real performance of the real network. In this way, the simulated network may be moved through inclusion of faults such that it provides an accurate depiction of faults which cause the observed network performance in the real network.

The following illustrates exemplary pseudo code which may be executed to provide the procedure 700 of FIG. 7.

1) Let NS denote the network settings
    (i.e., signal strength, traffic statistics, and routing tables)
   Let RealPerf denote the real network performance
2) FaultSet = { }
3) Predict SimPerf by running simulation with input (NS; FaultSet)
4) if |Diff (SimPerf, RealPerf)|> threshold
    go to (5)
   else
    go to (7)
5) Initial diagnosis: initialize FaultSet by applying the algorithm of FIG. 5
6) while (not converged)
   a) adjusting fault magnitude
     for each fault type ft in FaultSet (in the order of decision tree in FIG. 6)
      for each fault i in (FaultSet, ft)
       magnitude(i)- = g($Diff_{ft}$ (SimPerf(i), RealPerf (i)))
       if (|magnitude(i)| <threshold)
        delete the fault (ft, i)
   b) adding new candidate faults if necessary
     foreach fault type ft (in the order of decision tree of FIG. 6)
      i) find a fault i s.t. it is not in FaultSet and has the largest |$Diff_{ft}$
       (SimPerf (i);RealPerf (i))|
      ii) if |$Diff_{ft}$ (SimPerf(i), RealPerf(i))|> threshold)
       add (ft, i) to FaultSet with magnitude(i) = g($Diff_{ft}$ (SimPerf(i), RealPerf (i))
   c) simulate
7) Report FaultSet Thus, the above pseudo code describes an exemplary diagnostic algorithm that is configured to diagnose faults of multiple types.

Removing Errors in Trace Data

In the previous sections, fault diagnosis was described in which trace data was utilized to drive an online simulation. In practice, raw trace data that is collected by agent modules, when executed on respective nodes, may contain errors for various reasons as mentioned earlier, such as due to hardware, software, and/or network errors. Therefore, the cleaning module 120(N) of FIG. 1 may be executed to clean the "raw" trace data received from the plurality of agents to provide cleansed trace data as an input to the simulator 118(N) for fault diagnosis.

Figure 8:
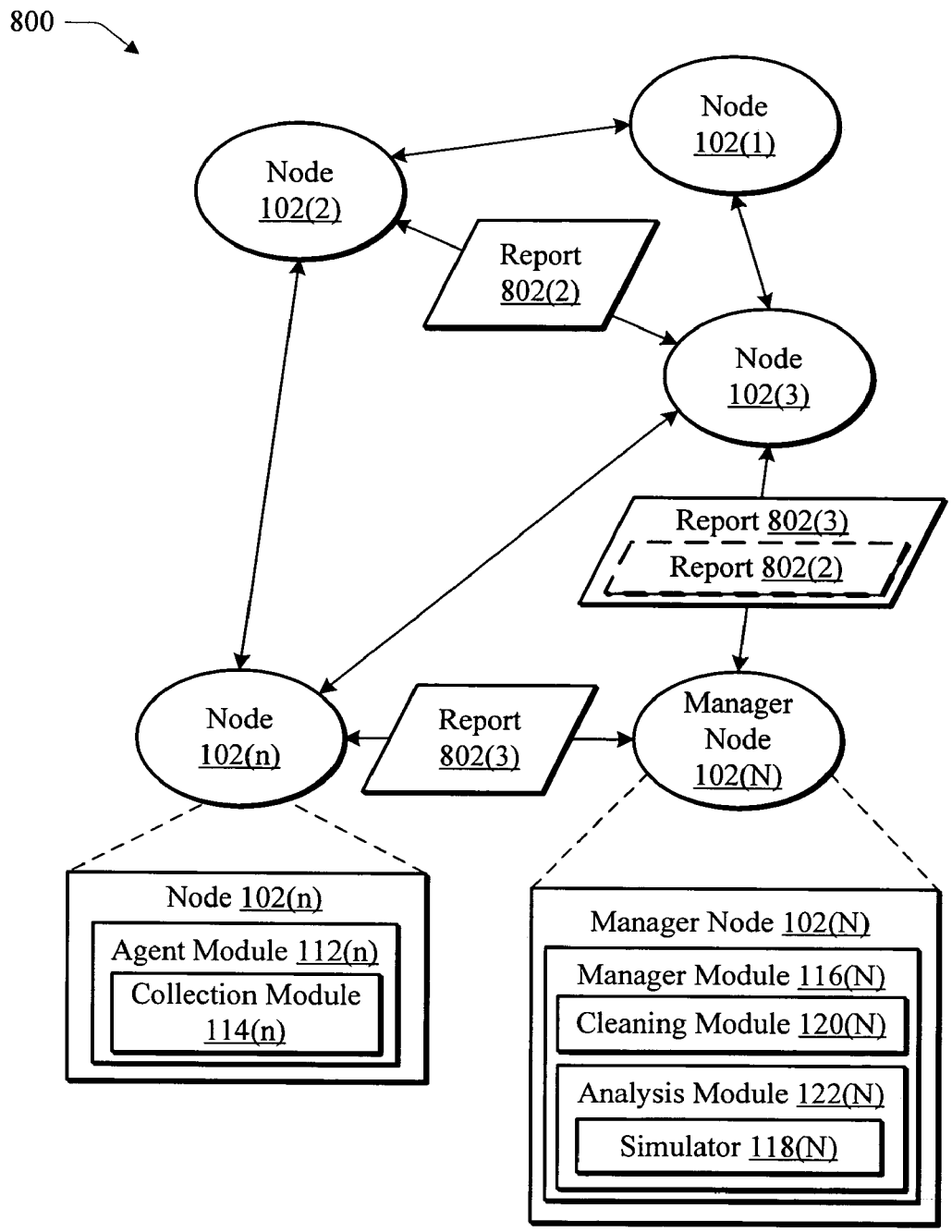
FIG. 8 is an illustration of a network in an exemplary implementation in which the plurality of nodes of FIG. 1 includes agent modules that are executable to perform neighbor monitoring.

FIG. 8 is an illustration of a network 800 in an exemplary implementation in which the plurality of nodes 102(1)-102

(N) of FIG. 1 include agent modules that are executable to perform neighbor monitoring. The agent modules that are executed on each of the nodes in the network perform neighbor monitoring, which is a technique in which each of the plurality of nodes 102(1)-102(N) reports performance and traffic statistics not only for its own incoming/outgoing links, but also for other links within its communication range. Neighbor monitoring may be performed in a variety of ways. For instance, an agent module on a first node may be executed to examine a second node in the network to obtain network performance data from the second node. In another instance, the first node receives a communication from the second node, such as a broadcast, that includes the network performance data. In a further instance, the first node monitors data sent by the second node for communication through the network to monitor the network performance. The first node, for instance, may operate in a "promiscuous" mode which allows a network connection device of the node to intercept and read each data packet that arrives at that particular node in its entirety.

Due to neighbor monitoring, multiple reports from different sources (i.e., nodes) are likely to be submitted for each link. Node 102(3), for example, may obtain a report 802(2) from node 102(2) that describes network performance of node 102(2), as well as the network performance of nodes 102(1), 102(n). Parentheticals utilized in the reference numbers of the reports in FIG. 8 are selected to show correspondence of the report with its respective node, e.g. node 102(2) and report 802(2).

Node 102(3) includes network performance data from the report 802(2) (which is illustrated in phantom in FIG. 8) in report 802(3) that is formed for communication to the manager node 102(N). The report 802(3) may also include network performance data obtained by node 102(3) by monitoring nodes 102(2), 102(1). In an implementation, the report 802(3) is optimized through execution of an agent module to remove redundant information. For instance, the agent module of node 102(3) may remove information that is consistent and repeated by nodes 102(2), 102(3) in the respective reports 802(2), 802(3), but leave data describing any inconsistencies in the data. Likewise, node 102(n) may execute the collection module 114(n) to obtain network performance data from nodes 102(2), 102(3). The network performance data is configured as a report 802(n) for communication to the manager node 102(N).

The redundant reports can be used by the manager node 102(N) to detect one or more inconsistencies in network performance. For example, reports 802(2), 802(3) may be compared to each other through execution of the cleaning module 120(N) by the manager node 102(N) to find inconsistencies in the network performance data described therein. The inconsistencies may be found in a variety of ways, an example of which is described in the following figure.

Figure 9:
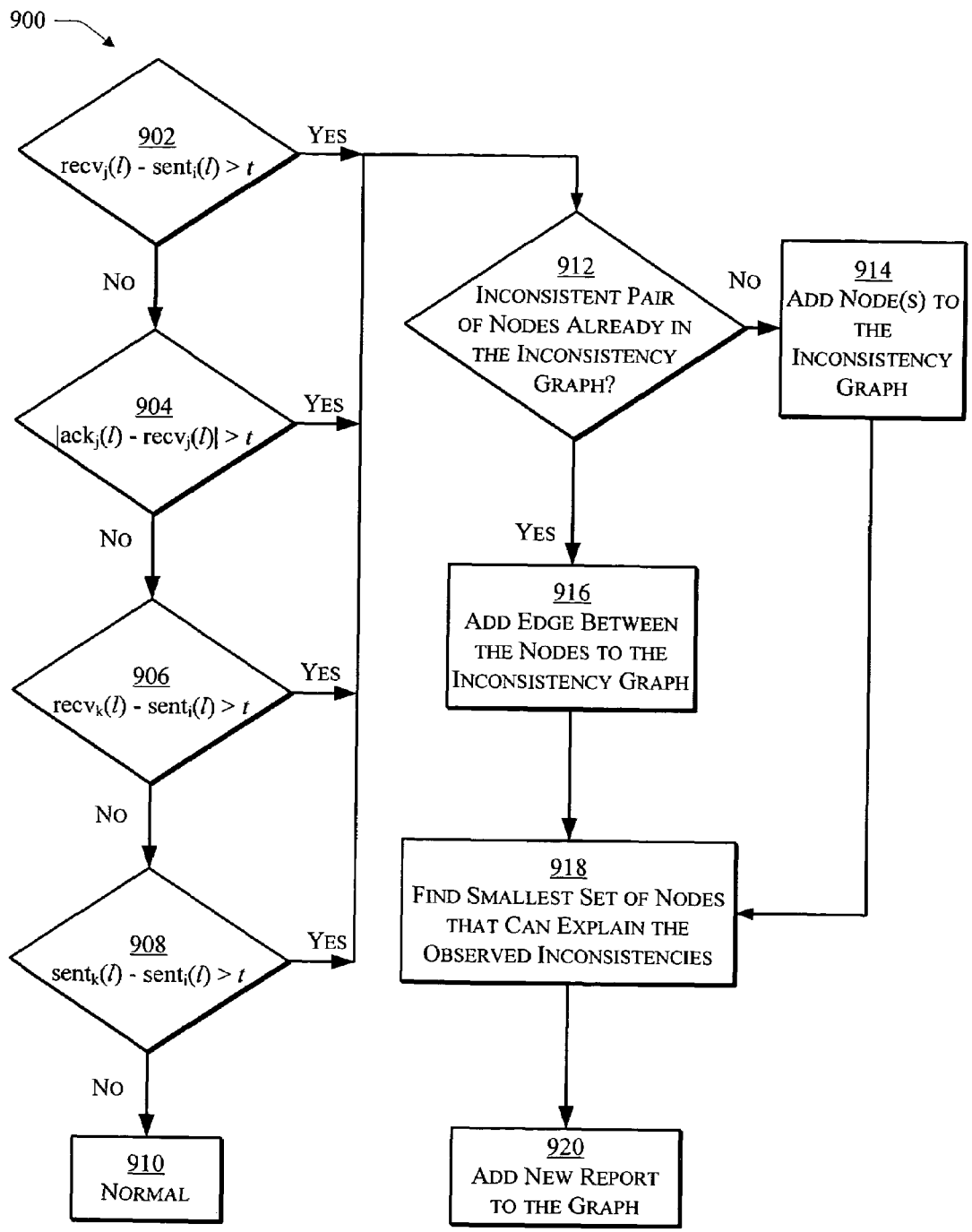
FIG. 9 is a flow diagram depicting a procedure in an exemplary implementation in which reports which describe neighboring nodes are compared to locate a misbehaving node in a network.

FIG. 9 is a flow diagram depicting a procedure 900 in an exemplary implementation in which reports which describe neighboring nodes are compared to locate a misbehaving node in a network. In this implementation, the procedure 900 identifies the misbehaving nodes as the minimum set of nodes that can explain the discrepancy in the reports.

In the procedure 900 described in relation to FIG. 9, a sending node i reports a number of packets sent and a number of MAC-level acknowledgements received for a directed link l as ($sent_i(l)$, $ack_i(l)$). A receiving node j reports the number of packets received on the link as $recv_j(l)$. In addition, a sending or receiving node's immediate neighbor k also reports the number of packets and MAC-level acknowledgements that are sent or received on the link as ($sent_k(l)$, $recv_k(l)$, $ack_k(l)$). An inconsistency in the reports is defined as one of the following cases.

At decision block 902, a determination is made as to whether a number of packets received on a link, as reported by its destination, is significantly greater (as described by a threshold) than the number of packets sent on the same link, as reported by its source. That is, for the link l from node i to node j, and given a threshold t, the following determination is made:

$recv_j(l) - sent_i(l) > t$

The threshold t is utilized, since the communication of the reports by the respective nodes is not typically synchronized. If the number of packets received is significantly greater than the number of packets sent, then an inconsistency in the reports is noted (block 904). If the numbers of packets received and sent by the respective nodes correspond (block 906), then the procedure 900 progresses to block 906.

At decision block 906, a determination is made as to whether a number of MAC-level acknowledgments transmitted on a link, as reported by its source, corresponds to a number of packets received on that link, as reported by its destination. In other words, for the link l from node i to node j, and given a threshold t, the following is determined:

$|ack_i(l) - recv_j(l)| > t$

Thus, if the number of acknowledgments do not correspond (i.e., approximates) the number of packets received (block 906), then an inconsistency in the reports is noted (block 904). If the numbers of acknowledgments and packets received do correspond (block 906), then the procedure 900 progresses to block 908.

At decision block 908, a determination is made as to whether a number of packets received on a link, as reported by a neighbor of its destination, is significantly greater than the number of packets sent on the same link, as reported by its source. That is, for link l from node i to node j, in which node j's neighbor is node k, and given a threshold t, the following is determined:

$recv_k(l) - sent_i(l) > t$

Thus, if the number of packets received corresponds (i.e., approximate) the number of packets sent (block 908), then an inconsistency in the reports is noted (block 904). Otherwise, the procedure 900 then progresses to block 910.

At decision block 910, a determination is made as to whether a number of packets sent on a link, as reported by a neighbor of its source, is significantly greater than a number of packets sent on the same link, as reported by its source. In other words, for the link l from node i to node j, i's neighbor k, and given a threshold t, the following is determined:

$sent_k(l) - sent_i(l) > t$

As shown in the above equation, if the number of packets sent approximates the number of packets sent (block 910) as indicated, respectively, by the source and neighboring nodes, then an inconsistency in the reports is noted (block 904). Otherwise, the reports are consistent (block 912).

For each inconsistency that has been noted at block 904, an inconsistency graph is constructed as follows (block 914). At decision block 916, a determination is made as to whether an inconsistent pair of nodes is already included in the inconsistency graph. If not, the nodes are added to the inconsistency graph (block 918). If the inconsistent pair of nodes are already in the inconsistency graph (block 916) or have been added to the inconsistency graph (block 918), an edge is added between the nodes in the inconsistency graph.

At block 922, a smallest set (i.e., least number) of nodes is found in the inconsistency graph that can explain the observed inconsistencies. For instance, an assumption may be made that most nodes in the network send reliable reports. Therefore, the smallest set of nodes that can explain the observed inconsistencies is found. This can be achieved, for instance, by finding the smallest set of vertices that covers the inconsistency graph, where the identified vertices represent the misbehaving nodes.

The smallest set of vertices may be found through utilization of a minimum vertex cover problem, which is known to be NP-hard. A greedy algorithm is applied which iteratively picks and removes the node and the incident edges from a current inconsistency graph until no edges are left.

A history of reports can be used to further improve the accuracy of inconsistency detection. For example, at block 924 a new report may be added to update the inconsistency graph without deleting previous information. Inconsistent pairs of nodes in the new report may then be processed using blocks 916-922 of the procedure 900. For instance, the same greedy algorithm of block 922 may be reapplied to identify misbehaving nodes.

What-If Analysis

In the previous sections, faults were selectively injected into a network simulation to identify which faults, if any, may have cause a difference between expected and observed network performance. The network simulation may also be utilized to perform "what-if" analysis to improve operation of the network. What-if analysis allows the manager module, when executed, to determine the effect of different possible network and node configurations on network performance. The result of the what-if analysis is a set of actions that allows the manager module to operate the network efficiently, such as by causing the agent module on selected nodes in the network to configure the respective node accordingly.

What-if analysis, for instance, may be carried out through the use of an online trace-driven simulation as previously described. Exemplary traces are identified in the following discussion which may that collected to drive the simulator (e.g., simulator 118(N) of FIG. 2). For instance, the simulator may be utilized to provide a network simulation of a real network. The network simulation may be reconfigured to test different node and network configurations and determine which configuration yields the best overall network performance for the existing traffic conditions. The manager module may then determine a set of actions for implementation by particular nodes in the network based on the configuration.

Traditional techniques that were employed for what-if analysis used simplified network models and derived the expected performance analytically. The online trace-driven simulation, however, has advantages over theoretical analysis in that the use of a simulator offers improved insight into the behavior of the network than is possible by a heuristic or theoretical technique by itself. For example, an operational wireless network is a complex system with many intricate pieces including traffic flows, networking protocols, signal processing algorithms, hardware, RF propagation, and most importantly the interaction between each of these pieces. Further, the network behavior may be governed by the interaction between nodes within range of one another and by noise sources in the vicinity. Neither heuristic nor theoretical techniques capture the behavior of such networks and the interactions between the different components.

Figure 10:
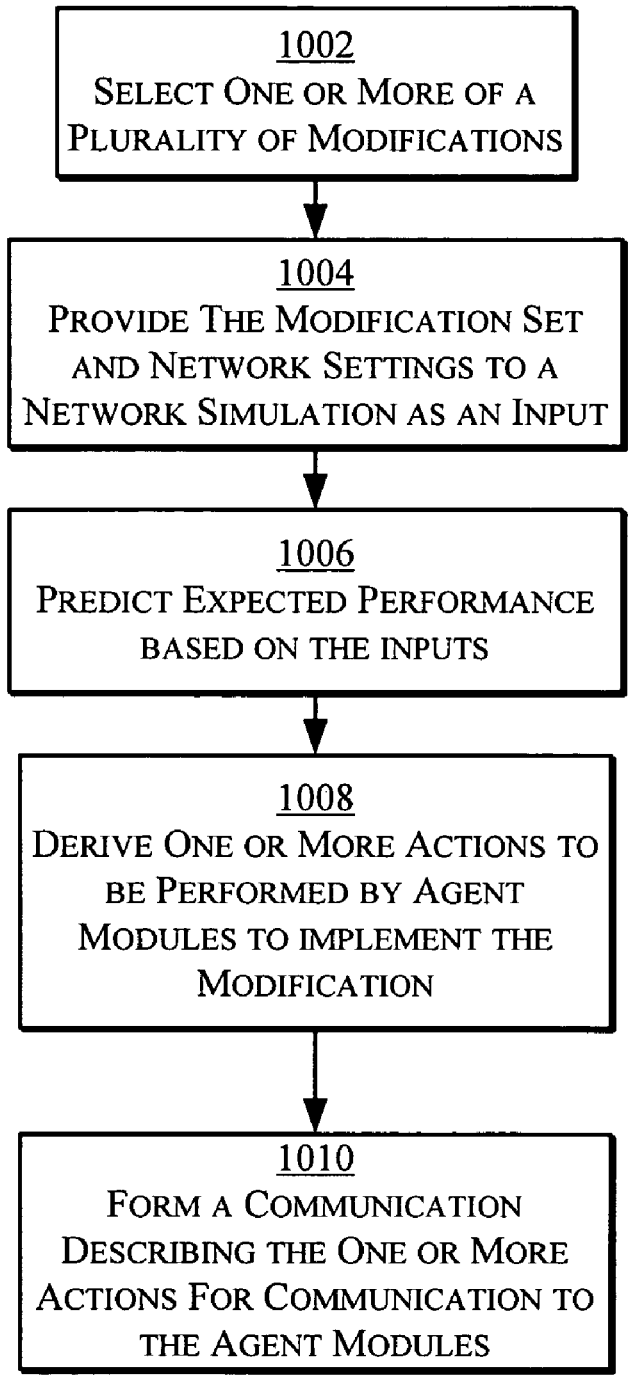
FIG. 10 is flow chart depicting a procedure in an exemplary implementation in which what-if analysis is performed based on an online trace-driven simulation.

FIG. 10 is flow chart depicting a procedure 1000 in an exemplary implementation in which what-if analysis is performed based on an online trace-driven simulation. At a high level, the procedure 1000 first reproduces a real network using a network simulation. Consequences of modifications to the network, when applied to the real network, are then determined by applying those changes in the network simulation to quantify network performance implications.

At block 1002, one or more of a plurality of modifications are selected through execution of the manager module. Modifications may be selected in a variety of ways. For instance, modifications may be considered by the manager module as a fault that causes an increase instead of a decrease in network performance. Modifications in such an instance may be stored in the faults directory 218 of FIG. 2 and arranged based on type. At block 1004, the analysis module provides network settings of a real network and a modification set that includes the selected modifications to a network simulation as an input.

At block 1006, expected performance of the network is predicted based on the inputs. For instance, the simulator may create a network simulation based on the network settings of the real network and the modification set. The network simulation, as previously described, may then be utilized to determine the consequences of the modifications to the real network.

The analysis module, when executed, derives one or more actions to be performed by agent modules of the network to implement the modification (block 1008). The analysis module, for instance, may include a directory of actions that are mapped to corresponding modifications. The analysis module may then obtain corresponding actions based on the modifications.

At block 1010, the analysis module forms a communication describing the one or more action for communication to the corresponding agent modules. The corresponding agent modules may then cause the respective nodes of the network to implement the actions described therein. Thus, the manager and agent modules may be utilized to perform what-if analysis based on an online trace-driven simulation in a manner similar to fault detection. What-if analysis may be utilized for correcting faults and improving network performance.

In another exemplary implementation, simulation is used to determine a modification to be made to a network to improve network performance, such as by using an iterative approach to perform what-if analysis. This approach is similar to the simulation as described in relation to FIGS. 5 and 7. Thus, iteration refining could be used when multiple modification actions are needed.

Figure 11:
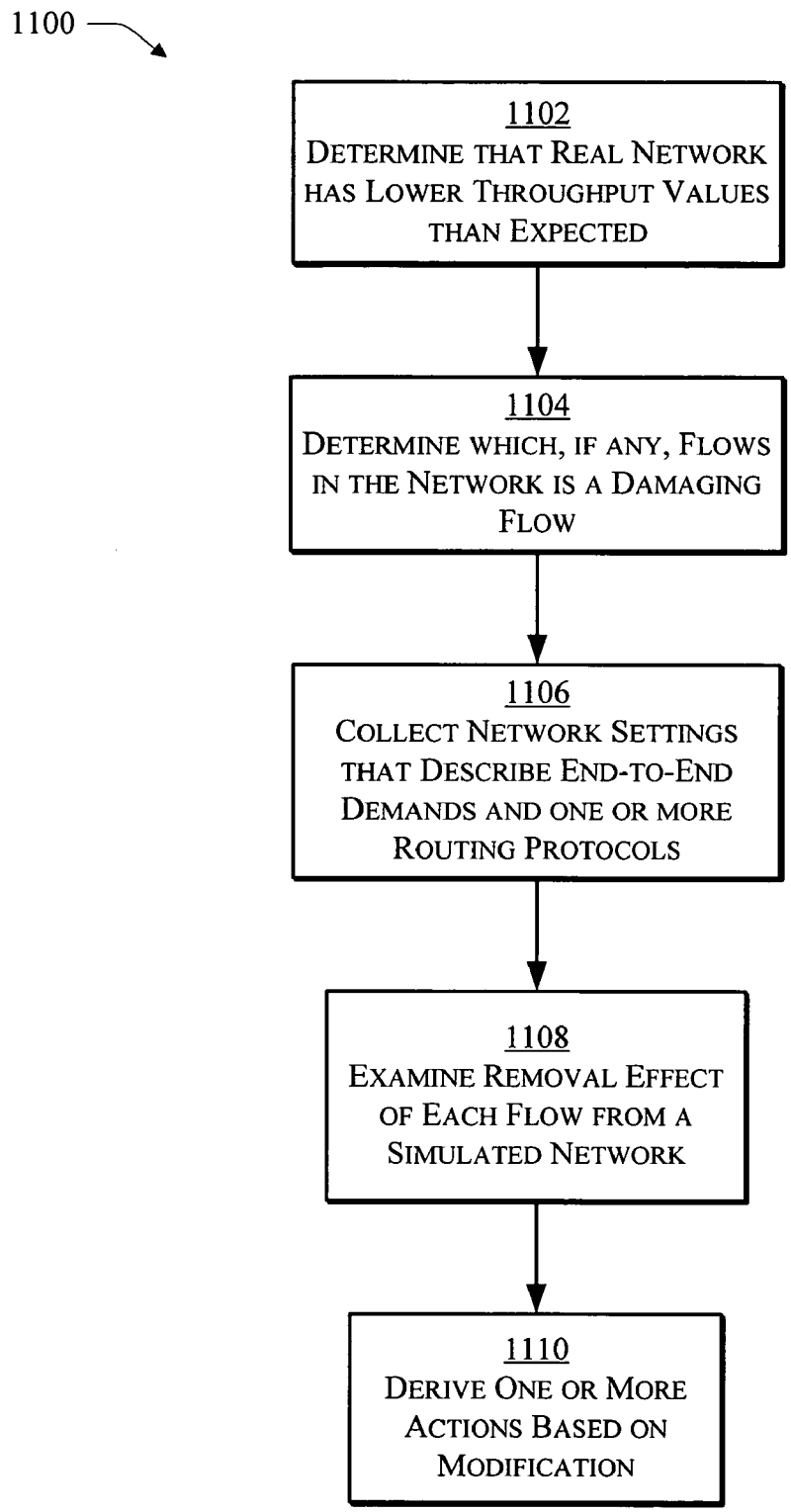
FIG. 11 is a flow diagram depicting a procedure in an exemplary implementation in which modifications to a network are derived based on a diagnosis of a damaging flow.

FIG. 11 is a flow diagram depicting a procedure 1100 in an exemplary implementation in which modifications to a network are derived based on a diagnosis of a damaging flow. At block 1102, a manager module (e.g., manager module 116(N) of FIGS. 1 and 2) is executed to determine that one or more flows in a network are experiencing lower throughput values than their corresponding expected target throughput values. At block 1104, the manager module determines which, if any of the flows in the network are a "damaging flow". A damaging flow is a type of fault whose presence causes serious degradation in network throughput, and is different from the previous faults in that the damaging flow may be healthy by itself but does not interact well with other competing flows.

At block 1106, for instance, network settings are collected that describes target end-to-end demands and the routing protocols that is in use. It should be noted that these network settings may be different from the traces used for troubleshooting, because the procedure 1100 examines how the network (e.g., link loads and routing) will react to the changes in network configuration.

Figure 12:
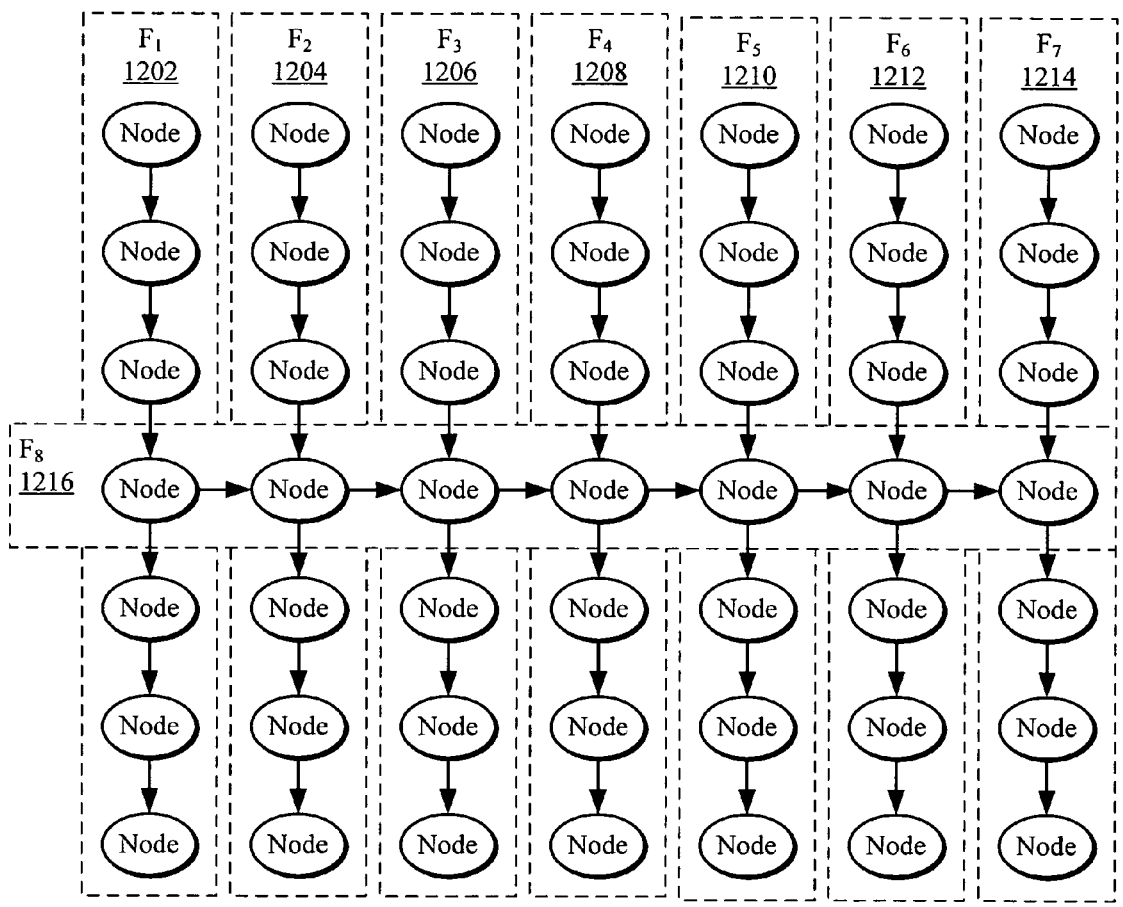
FIG. 12 is an illustration of a network that includes a plurality of flows, one of which being a damaging flow.

At block 1108, the effect on the aggregate network throughput is examined based on removal, one at a time, of each flow from a network simulation. In an implementation, a damaging flow is identified as the one flow whose removal yield the most significant overall improvement to network performance. For example, a network 1200 is shown in FIG. 12 that includes a plurality of flows 1202-1216. Flow eight 1216 (illustrated as $F_8$ in FIG. 12), crosses each of the other flows 1202-1214 in the illustrated network 1200. Therefore, the removal of flow eight 1208 may result in the largest increase in throughput, as opposed to removal of any of the other flows 1202-1214. In other words, the presence of flow eight 1216 causes the greatest amount of damage to the performance of the network 1200. In this way, a modification (e.g., removal or reduction of the influence of flow eight 1216 on the other flows of the system) to the network 1200 may be determined which results in the greatest increase in network performance.

At block 1110, one or more actions are derived based on the modification which may be utilized to improve network performance. Exemplary actions may include rate-limiting, rerouting, and topology control of flow eight 1216. The network simulation enables the manager module to further evaluate the benefit of these actions accurately. For example, the following table shows an expected throughput for exemplary corrective actions.

| Action | Total Throughput (Mbps) |
|---|---|
| No Action | 1.064 |
| Reduce Flow 8's rate by half | 1.148 |
| Route Flow 8 via Grid Boundary | 1.217 |
| Increase transmission power to 20 dBM | 0.990 |
| Increase transmission power to 25 dBM | 1.661 |

As shown in the table, an increase in transmission power to 25 dBm yields the highest throughput among the four exemplary actions (and one inaction) under consideration, since it reduces the number of hops needed to reach a destination. Based on these results, the manager module forms a communication which causes one or more of the agents on the respective nodes to increase power to alleviate the network performance problem.

Exemplary Framework Implementation

An example of the described framework has been implemented on a WINDOWS XP platform (WINDOWS XP is a trademark of the Microsoft Corp., Redmond Wash.). Components of the exemplary implementation, design principles, and its features are described in this section.

The exemplary framework in this instance includes two separate components: agent modules and manager modules. As previously described in relation to FIG. 1, the agent module is executed on each node of the network to report local data either periodically or on-demand. A manager module collects relevant data from the agent modules and is executed to analyze the data, such as through execution of an included analysis module as described in relation to FIG. 2.

The exemplary framework employs simplicity and extensibility design principles. For example, the data gathered and propagated for monitoring and management may be cast into performance counters supported on WINDOWS (WINDOWS is a trademark of Microsoft Corp, Redmond Wash.). Performance counters may be provided as (name, value) pairs grouped by categories.

The described framework is also extensible. Adding to the data being monitored involves creation of a new category of performance counters and writing a module that updates the performance counter values as the information changes. Performance data related to transmission control protocol (TCP), user datagram protocol (UDP), internet protocol (IP), and workstation remote application programming interface (WRAPI) may be incorporated into the framework with little additional work.

Values in these performance counters may be read-only or writable. Writable counters, for instance, offer a way for an authorized manager node to change the values and influence the behavior of a node in order to fix problems or initiate experiments remotely, such as through communication of a manager module with an agent module being executed on difference respective nodes.

Figure 13:
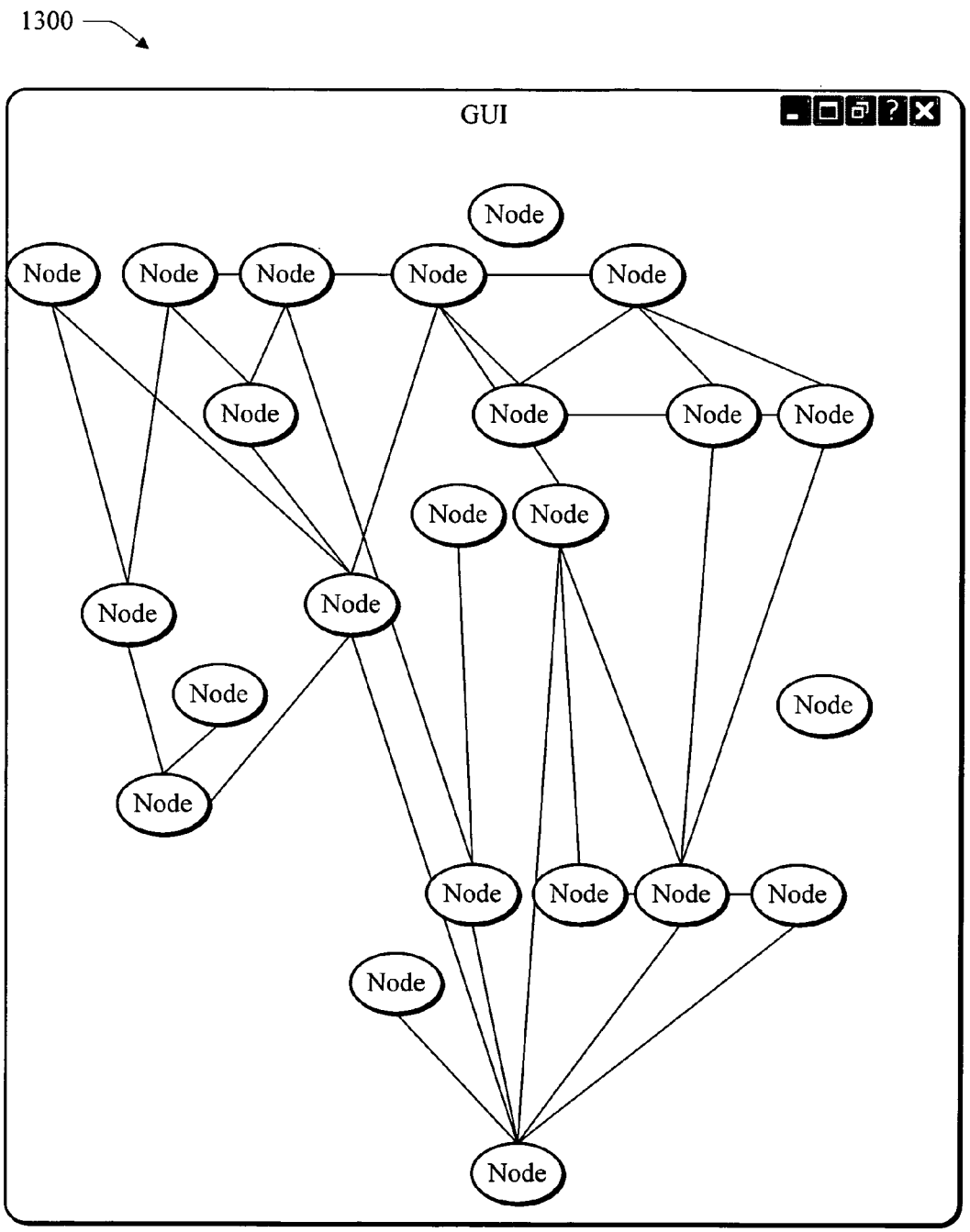
FIG. 13 is an illustration in an exemplary implementation showing a graphical user interface (GUI) provided by a manager node which allows a network administrator to visualize a network and issue management requests to the network.

Each manager node may also be equipped with a graphical user interface (GUI) 1300, an example of which is illustrated in FIG. 13, to interact with network administrators. The GUI allows an administrator to visualize the network as well as to issue management requests through the manager module. The GUI 1300 displays a topology for an exemplary network test-bed. The GUI 1300 in this instance depicts a manager window with agents deployed over a test-bed of 23 nodes. The manager module can display the topology based on the relative coordinates of the nodes either directly obtained or inferred. The GUI 1300 may also allow the administrator to zoom-in on a particular part of the network for more detailed information and to click on a link to cause a display of network performance data about a particular link in a table format.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is

1. A computer readable storage media encoded with computer executable instructions, executed by a processor to perform operations comprising:
   selecting one or more of a plurality of fault types for inclusion in a fault set;
   providing the fault set and network settings obtained from a real network as inputs to a first iterative network simulation, wherein the network setting include data that is selected from the group consisting of:
   network topology;
   traffic statistics;
   physical medium;
   network operation;
   target end-to-end demands of one or more nodes of the real network; and
   at least one routing protocol that is utilized in the real network;
   acquiring an estimation of network performance from the first iterative network simulation;
   determining a difference between the estimation of network performance and an actual observation of network performance of the real network;

determining whether the difference between the estimation of network performance and the actual observation of network performance of the real network is greater than a corresponding threshold during an initial fault diagnosis;

in an event the difference between the estimation of network performance and the actual observation of network performance of the real network is not greater than the corresponding threshold:
  reporting to a manager module, the fault set indicating that the real network is operating normally;

in an event the difference between the estimation of network performance and the actual observation of network performance of the real network is greater than the corresponding threshold:
  determining, for an individual one of the plurality of fault types, a differential between the estimation of network performance and the actual observation of network performance of the real network;
  translating the differential of the individual fault type into a fault magnitude by utilizing a function to map the impact of the individual fault type into the fault magnitude;
  updating the fault magnitude;
  determining whether the fault magnitude explains an observed discrepancy between an expected network performance and the actual observation of network performance of the real network;
  removing the individual fault type when the fault magnitude is below a predetermined threshold;
  determining whether expected performance of the network approximates real performance of the network;
    in an event the expected performance of the network approximates real performance of the network:
      reporting to the manager module, the fault set indicating that the expected performance of the network using the fault set is converging with real performance of the network; and
    in an event the expected performance of the network does not approximate real performance of the network:
      adding a new fault candidate to the fault set to be input to a second iterative network simulation;
wherein,
the second iterative network simulation utilizes the new fault candidate added to the fault set to determine whether the expected performance of the network is converging with the real performance of the network.

2. The computer readable storage media as described in claim 1, further performing operations comprising deriving one or more actions to be performed by another node of the network to implement the fault set.

3. The computer readable storage media as described in claim 1, wherein the network settings include data that describes a route formed by a series of hops taken by a data packet through the real network between an originating node and a target node.

4. The computer readable storage media as described in claim 1, wherein at least one of the network settings is provided by a trace utility.

5. The computer readable storage media as described in claim 1, wherein the network settings are provided by an agent module on the one or more nodes of the real network.

6. The computer executable instructions, executed by a processor as described in claim 5, further performing operations comprising:
  communicating a derived action; and
  causing the agent module on the one or more nodes to implement one or more modifications to the real network.

7. A method comprising:
selecting by an analysis module in a manager node, one or more of a plurality of fault types for inclusion in a fault set;
providing the fault set and network settings obtained from a real network as inputs to a first iterative network simulation, wherein the network settings include data that is selected from the group consisting of:
  network topology;
  traffic statistics;
  physical medium;
  network operation;
  target end-to-end demands of one or more nodes of the real network; and
  at least one routing protocol that is utilized in the real network;
acquiring an estimation of network performance from the first iterative network simulation;
determining by a processor, a difference between the estimation of network performance and an actual observation of network performance of the real network;
determining whether the difference between the estimation of network performance and the actual observation of network performance of the real network is greater than a corresponding threshold during an initial fault diagnosis;
in an event the difference between the estimation of network performance and the actual observation of network performance of the real network is not greater than a corresponding threshold:
  reporting to a manager module, the fault set indicating that the real network is operating normally;
in an event the difference between the estimation of network performance and the actual observation of network performance of the real network is greater than the corresponding threshold:
  determining for an individual one of the plurality of fault types, a differential between the estimation of network performance and the actual observation of network performance of the real network;
  translating the differential of the individual fault type into a fault magnitude by utilizing a function to map the impact of the individual fault type into the fault magnitude;
  updating the fault magnitude;
  determining whether the fault magnitude explains an observed discrepancy between an expected network performance and the actual observation of network performance of the real network;
  removing the individual fault type when the fault magnitude is below a predetermined threshold;
  determining whether expected performance of the network approximates real performance of the network;
    in an event the expected performance of the network approximates real performance of the network:
      reporting to the manager module, the fault set and indicating that the expected performance of the network using the fault set is converging with real performance of the network; and
    in an event the expected performance of the network does not approximate real performance of the network:
      adding, a new fault candidate to the fault set to be input to a second iterative network simulation;

wherein, the second iterative network simulation utilizes the new fault candidate added to the fault set to determine whether the expected performance of the network is converging with the real performance of the network.

8. The method as described in claim 7, further comprising deriving one or more actions to be performed by another node of the network to implement the fault set.

9. The method as described in claim 7, wherein the network settings include data that describes a route formed by a series of hops taken by a data packet through the real network between an originating node and a target node.

10. The method as described in claim 7, wherein at least one of the network settings is provided by a trace utility.

11. The method as described in claim 7, wherein the network settings are provided by an agent module on the one or more nodes of the real network.

12. The method as described in claim 11, further comprising:
communicating a derived action; and
causing the agent module on the one or more nodes to implement one or more modifications to the real network.

13. A system comprising:
at least one node;
a processor;
a network connection device for communicatively coupling the processor to a network; and
a memory configured to maintain:
a simulator to generate a network simulation that provides an estimation of network performance of the network;
a manager module executed by the processor to perform operations comprising:
selecting one or more of a plurality of fault types for inclusion in a fault set;
providing the fault set and network settings obtained from a real network as inputs to a first iterative network simulation, wherein the network settings include data that is selected from the group consisting of:
network topology;
traffic statistics;
physical medium;
network operation;
target end-to-end demands of one or more nodes of the real network; and
at least one routing protocol that is utilized in the real network;
acquiring an estimation of network performance from the first iterative network simulation;
determining a difference between the estimation of network performance and an actual observation of network performance of the real network;
determining whether the difference between the estimation of network performance and the actual observation of network performance of the real network is greater than a corresponding threshold during an initial fault diagnosis;
in an event the difference between the estimation of network performance and the actual observation of network performance of the real network is not greater than the corresponding threshold:
reporting to the manager module, the fault set indicating that the real network is operating normally;
in an event the difference between the estimation of network performance and the actual observation of network performance of the real network is greater than the corresponding threshold:
determining, for an individual one of the plurality of fault types, a differential between the estimation of network performance and the actual observation of network performance of the real network;
translating the differential of the individual fault type into a fault magnitude by utilizing a function to map the impact of the individual fault type into the fault magnitude;
updating the fault magnitude;
determining whether the fault magnitude explains an observed discrepancy between an expected network performance and the actual observation of network performance of the real network;
removing the individual fault type when the fault magnitude is below a predetermined threshold;
determining whether expected performance of the network approximates real performance of the network;
in an event the expected performance of the network approximates real performance of the network:
reporting to the manager module, the fault set indicating that the expected performance of the network using the fault set is converging with real performance of the network; and
in an event the expected performance of the network does not approximate real performance of the network:
adding a new fault candidate to the fault set to be input to a second iterative network simulation;
wherein, the second iterative network simulation utilizes the new fault candidate added to the fault set to determine whether the expected performance of the network is converging with the real performance of the network.

14. The system as described in claim 13, wherein the network settings include data that describes a route formed by a series of hops taken by a data packet through the real network between an originating node and a target node.

15. The system as described in claim 13, wherein at least one of the network settings is provided by a trace utility.

* * * * *